(12) United States Patent
Parmentier

(10) Patent No.: US 10,864,461 B2
(45) Date of Patent: Dec. 15, 2020

(54) ORGANIC GEL OR LIQUID CHROMATOGRAPHY METHOD

(71) Applicant: Francois Parmentier, St Martin d'Heres (FR)

(72) Inventor: Francois Parmentier, St Martin d'Heres (FR)

(*) Notice: Subject to any disclaimer, the term of this patent is extended or adjusted under 35 U.S.C. 154(b) by 300 days.

(21) Appl. No.: 15/515,082

(22) PCT Filed: Sep. 29, 2015

(86) PCT No.: PCT/EP2015/072466
§ 371 (c)(1),
(2) Date: Mar. 28, 2017

(87) PCT Pub. No.: WO2016/050789
PCT Pub. Date: Apr. 7, 2016

(65) Prior Publication Data
US 2018/0229151 A1    Aug. 16, 2018

(30) Foreign Application Priority Data
Sep. 29, 2014 (FR) .................. 14 59175

(51) Int. Cl.
*B01D 15/22* (2006.01)
*B01J 20/291* (2006.01)
(Continued)

(52) U.S. Cl.
CPC .......... *B01D 15/22* (2013.01); *B01J 20/2805* (2013.01); *B01J 20/285* (2013.01);
(Continued)

(58) Field of Classification Search
CPC ............... B01D 15/22; B01J 20/28042; B01J 20/28047; B01J 20/2805; B01J 20/28078; B01J 20/285; B01J 20/291; B01J 29/292
See application file for complete search history.

(56) References Cited

U.S. PATENT DOCUMENTS 4,007,138 A    2/1977  Kanig
4,957,620 A    9/1990  Cussler
(Continued)

FOREIGN PATENT DOCUMENTS

CN    102883806 A    1/2013
JP    2009-007550 A    1/2009
(Continued)

OTHER PUBLICATIONS

Fujita et al., Chromatography in Presence of High Concentrations of Salts on Columns of Celluloses with and without Ion Exchange Groups (Hydrogen Bond Chromatography), 1980, J. Biochem. 87, 89-100 (Year: 1980).*
(Continued)

*Primary Examiner* — David Z Huang
(74) *Attorney, Agent, or Firm* — Womble Bond Dickinson (US) LLP

(57) ABSTRACT

The invention relates to a chromatography method in which a gaseous, liquid or supercritical mobile phase containing species to be separated is circulated through a packing, said packing comprising: —a plurality of capillary ducts extending in the packing between an upstream face through which the mobile phase enters the packing and a downstream face through which the mobile phase leaves the packing, and —a continuous medium permeable to molecular diffusion extending between said ducts, comprising a porous organic gel or an organic liquid and including at least one network of connected pores, the size of which is greater than two times the molecular diameter of at least one species to be separated and opening to the ducts, so as to give said at least one species a diffusive path between said ducts. The invention also relates to a packing for the implementation of such a method and a method for manufacturing such a packing.

24 Claims, 15 Drawing Sheets

(51) Int. Cl.
  *B01J 20/292* (2006.01)
  *B01J 20/28* (2006.01)
  *B01J 20/285* (2006.01)
  *B01D 53/02* (2006.01)

(52) U.S. Cl.
  CPC ... *B01J 20/28042* (2013.01); *B01J 20/28047* (2013.01); *B01J 20/28078* (2013.01); *B01J 20/291* (2013.01); *B01J 20/292* (2013.01); *B01D 53/025* (2013.01); *B01D 2253/202* (2013.01); *B01D 2253/308* (2013.01); *B01D 2253/31* (2013.01); *B01J 2220/84* (2013.01)

(56) References Cited

U.S. PATENT DOCUMENTS

| | | | |
|---|---|---|---|
| 7,473,367 | B2 | 1/2009 | Xie |
| 7,922,908 | B2 | 4/2011 | Allington et al. |
| 8,017,015 | B2 | 9/2011 | Clarke et al. |
| 2007/0017870 | A1 | 1/2007 | Belov et al. |
| 2009/0039018 | A1 | 2/2009 | Jordi et al. |
| 2013/0075317 | A1* | 3/2013 | Parmentier ........ B01J 20/28045 210/198.2 |
| 2017/0259190 | A1* | 9/2017 | Parmentier ............ B01D 15/22 |

FOREIGN PATENT DOCUMENTS

| | | |
|---|---|---|
| JP | 2010-243476 A | 2/2010 |
| JP | 2013522615 A | 6/2013 |
| WO | 2011/114017 A2 | 9/2011 |
| WO | WO2011114017 A2 | 9/2011 |
| WO | 2013/064754 A1 | 5/2013 |

OTHER PUBLICATIONS

Preliminary Research Report and Written Opinion received for French Application No. 1459175, dated Jul. 13, 2015, 9 pages (1 page of French Translation Cover Sheet and 8 pages of original document).

Park et al., "Measurement of the Effective Diffusivity in Porous Media by the diffusion Cell Method", Catalysis Review: Science and Engineering, vol. 38, No. 2, 1996, pp. 189-247.

Marais et al., "Water Diffusion and Permeability in Unsaturated Polyester Resin Flms Characterized by Measurement Performed with a Water-Specific Permeameter : Analysis of the Transient Permeation", Journal of Applied Polymer Science, vol. 74, No. 14, 1999, pp. 3380-3395.

International Search Report and Written Opinion received for PCT Patent Application No. PCT/EP2015/072466, dated Dec. 2, 2015, 22 pages (12 pages of English Translation and 10 pages of Original Document).

International Preliminary Report on Patentability received for PCT Patent Application No. PCT/EP2015/072466, dated Apr. 13, 2017, 20 pages (12 pages of English Translation and 8 pages of Original Document).

* cited by examiner

FIGURE 16
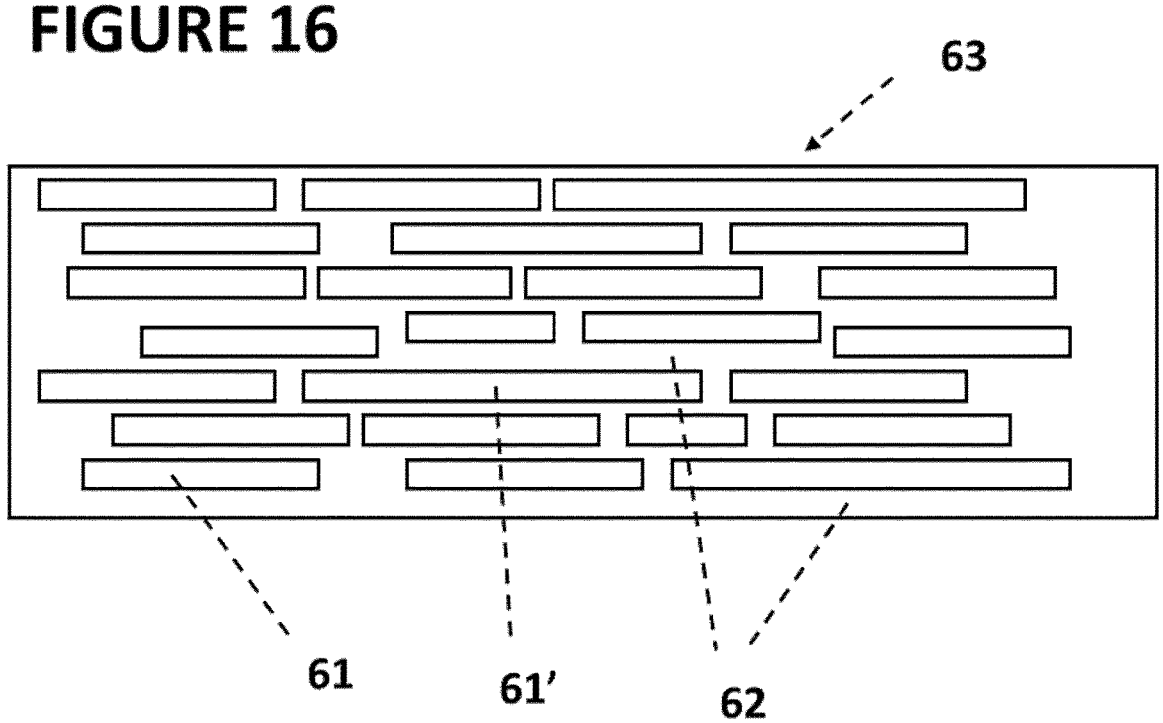
FIGURE 17
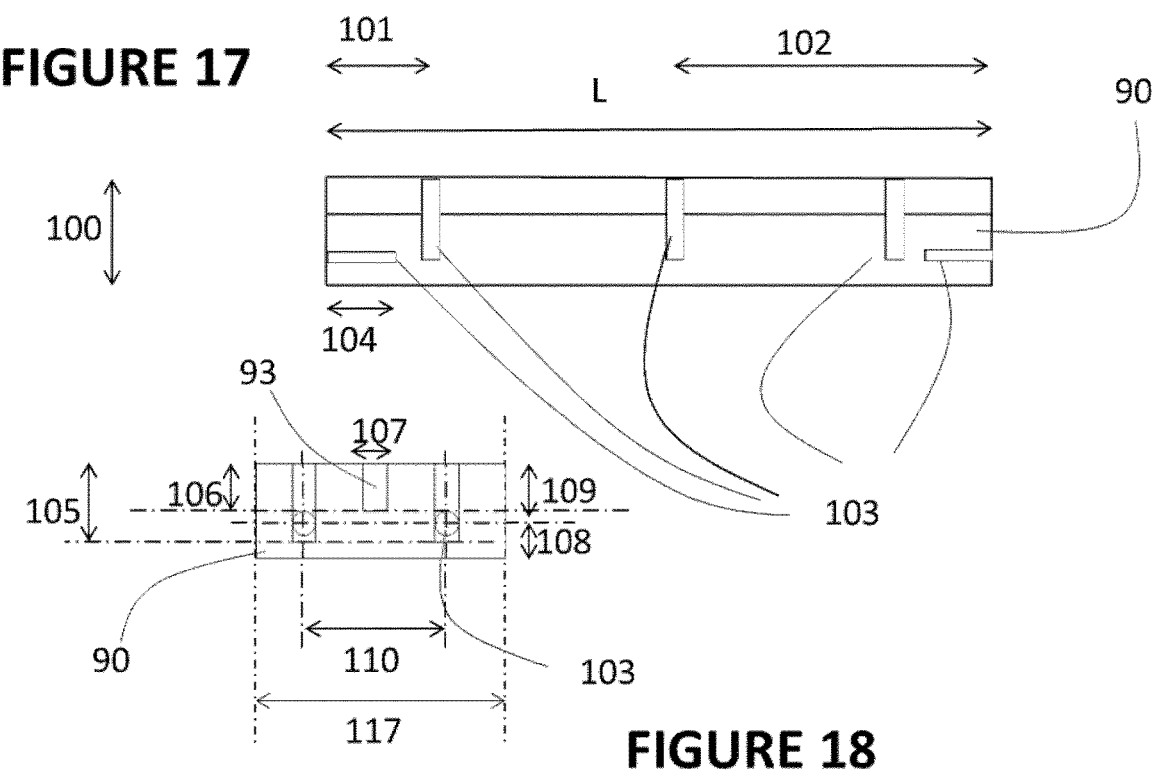
FIGURE 18

FIGURE 19
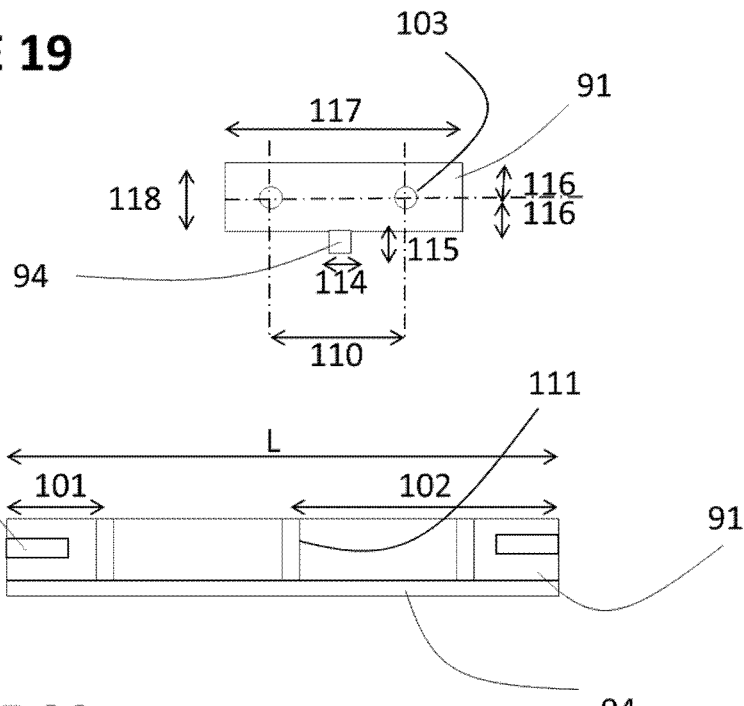
FIGURE 20
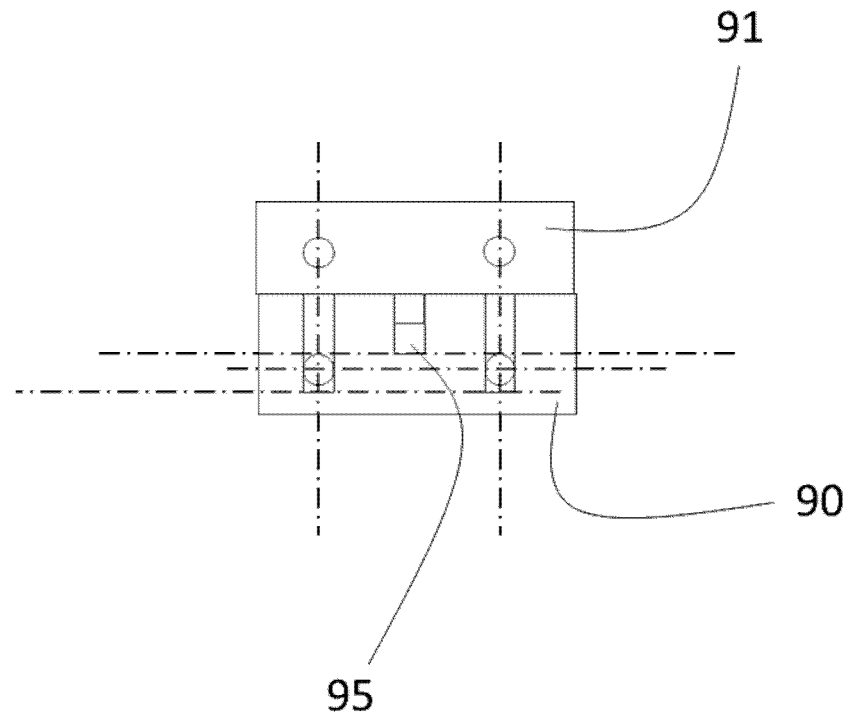
FIGURE 21

ORGANIC GEL OR LIQUID CHROMATOGRAPHY METHOD

FIELD OF THE INVENTION

The present invention relates to a chromatography method on an organic gel or liquid.

BACKGROUND OF THE INVENTION

Chromatography is a molecular separation method aiming at separating mixed species in a sample under the contradictory action of dynamic carrying away of said species by a stream of a mobile phase (also called "eluting phase") and of a retention of said species by a stationary phase.

The retention conditions depend on the chemical affinity between each species and the stationary phase.

Chromatography is characterized in that it requires great regularity of the stationary phase and of its support and low characteristic diffusional distances. This diffusional distance is generally the size of the grains of a solid of a particle bed or the diameter of an empty capillary tube. In practice, this distance is always less than 0.5 mm. This results in a theoretical number of separation stages greater than 200 generally.

Chromatography is a particular technique, which has its advantages and specific constraints and is differentiated thereby in the same way from other techniques which apply solid packings and fluids, like adsorption and heterogeneous catalysis.

In adsorption, it is sought to retain a compound from a fluid effluent on the surface of which it is adsorbed via an isotherm, or on which it reacts. It is sought to purify the fluid. High specific surface areas are needed. High capacity beds are needed. The efficiency of the packing is not critical (number of theoretical plates) and use is preferred of beds of granules with diameters from 1 to 2 mm. Indeed, the efficiency has only a negligible influence on the dimensioning of the bed insofar that it will only act on the stiffness of the percolation front, which is adequate as soon as about 20 theoretical plates are attained. The adsorbent must then be regenerated by a combination of means, temperature or chemical reaction, which removes the adsorbed or combined impurities. The operation is therefore sequential but the cycle times are numbered in days or in weeks. One dimensions based on the mass of the bed. The pressure drops are low.

In catalysis, it is sought to carry out a chemical reaction on the surface of the solid. It is desired that the reagents remain for an optimum time in contact with the solid. There again these are adsorption forces and chemical reaction forces. Interest is focused with criteria of dwelling time. The reasoning in the number of theoretical plates is inoperative. The regularity of the packing is one factor from among other ones and is secondary in front of catalytic selectivity. It is not sought to separate molecules. The pressure drops are low.

In chromatography, several species present in a fluid load sequentially admitted according to a short time interval counted in minutes, are separated by propagating an inlet point to an outlet point of a solid column under the effect of an eluting fluid The obtained separation may then be obtained with a very wide variety of forces which compete with the driving effect of the eluent, partition, adsorption, steric interactions, ionic interactions, etc. . . . . This method provides a high resolving power, each component behaving in a different way. In order to enhance this resolving power, the column should have a high number of theoretical plates, for example 1,000. This also means that the diffusional resistances have to be minimized, and therefore that the diffusion distances are short, and that the column has to be long. These combined factors ensure that chromatography is a technique which requires excellent regularity of the flow and therefore of the packing, and a small characteristic dimension of the latter, leading to pressure drops which become rapidly critical with particulate solids. These are the problems which have to be solved in chromatography.

On the other hand, preparative chromatography which may be carried out in a practical and simple way is one of the essential problems of chemical engineering.

U.S. Pat. No. 4,957,620 of Cussler E. describes the use of polymeric hollow fiber bundles for use as a chromatographic column. However hollow fibers act independently of each other like chromatographic columns. Consequently, the differences in behavior between the fibers lead to very poor efficiencies. The fibers have little or no contact and do not communicate through diffusion. They are stacked in a not very compact way. Molecular diffusion can only occur between the conduits. This explains the very small number of theoretical plates of the obtained separations, of the order of 40, with respect to the expected maximum on a single fiber, of the order of 6,000.

The publication "Hollow-Fiber Liquid Chromatography" of Hongbing Ding and E. Cussler, AIChE Journal, 1989, Vol 35, No. 5, pp 814-820, details the bases of the previous patent. It is clearly mentioned on page 815 that the tests are conducted on modules with a diameter of 4 cm containing 27,000 hollow fibers with an inner diameter of 100 µm and a wall thickness of 30 µm. A simple calculation shows that the hollow fibers do not have a compact stack, and that the volume outside the fibers represents more than 50% of the total volume of the module. It is also explicitly mentioned on page 815, in the 3 last lines that the solvent making up the stationary phase wets the hydrophobic fibers, but does not flow through the fiber towards the outside of the fiber. The volume outside the fibers therefore remains filled with gas, in this case air, and free of any solvent. The result of this is that the resistance to the radial transfer of material between the fibers increases, causing lowering of the separation efficiency.

U.S. Pat. No. 4,007,138, of Kanig G. describes a method for manufacturing gels of PS-DVB (PolyStyrene-DiVinyl-Benzene) provided with a polymeric reinforcement matrix.

U.S. Pat. No. 8,017,015 of Clarke et al. describes the state of the art of the methods for manufacturing organic gels and their application in chromatography columns.

U.S. Pat. No. 7,922,908, describes the use of X-rays for initiating polymerization of the organic gel. This method is particularly useful for making bulk packings. It will also be noted that the polymerization temperature may be close to room temperature, from 50° C. up to 90° C.

U.S. Pat. No. 7,473,367 of Xie S. describes methods for obtaining organic gels. Patent application WO 2011/114017 of Parmentier shows a packing for chromatography consisting of a monolithic porous packing. In its examples, a packing in a thermosetting polyester resin which may be made according to the state of the art, is described. However, this packing consists of a rigid and non-porous polymer not allowing any appreciable diffusivity. Indeed, publication [1] provides measurements of permeability and diffusivity of a thermosetting polyester. The result of this is that the water has in this material a diffusivity of $0.6 \cdot 10^{-12}$ m$^2$/s, corresponding to a permeability of 750 Barrers. This permeability is similar to that of polyethylene or polycarbonate, materials recognized as being leak-proof and non-porous being used for making containers or impermeable walls. The thermosetting polyester therefore not allowing an exchange of material by molecular diffusion between adjacent conduits, the efficiency of such a packing in chromatography will be limited.

It emerges from the state of the art that these organic monoliths are not very easy to manufacture, particularly in large dimensions, and with characteristics which are difficult to reproduce. They are further sensitive to the applied pressure and subject to swellings in the presence of solvents or of molecules to be separated. Their pore size is adjustable with difficulty. Their mechanical fragility makes them not very capable of resisting significant compressional forces. Therefore they cannot be used in chromatography columns operating under high pressure drops, greater than a few bars. Present packings are often particulate, having a high pressure drop, and are therefore found to be limited in particle diameter and therefore in efficiency.

Organic monoliths however have many advantages, as compared with silica, particularly in terms of pore size and of chemical stability at a high pH and because of their total insolubility in water.

Therefore there remains the need of proposing stable, efficient and low-cost organic monoliths which may be manufactured reproducibly with large dimensions.

SHORT DESCRIPTION OF THE INVENTION

The invention proposes a chromatography method in which a gas, liquid or supercritical mobile phase containing species to be separated is circulated through a packing, said packing comprising:
  a plurality of capillary conduits extending in the packing between a so-called upstream face through which the mobile phase penetrates into the packing and a so-called downstream face through which the mobile phase emerges from the packing, and
  a continuous medium permeable to molecular diffusion extending between said conduits, including a porous organic gel or an organic liquid and including at least one network of connected pores, the size of which is greater than twice the molecular diameter of at least one species to be separated and open on the conduits, so as to provide to said at least one species, a diffusive path between said conduits.

According to an embodiment, the capillary conduits cross the packing right though between the upstream face and the downstream face. According to another embodiment, the capillary conduits are included in the packing and have at least one end opening inside said packing.

Advantageously, the mobile phase penetrates the totality of the first population of connected pores so as to achieve a continuum of monophasic mobile phase between the conduits.

Advantageously, the molecular diffusion of the species to be separated between the conduits is carried out within said mobile phase continuum.

Advantageously, the average molar flow rate of diffusion of the species to be separated between the adjacent conduits under the effect of a given concentration difference of said species between the walls of said conduits is greater than 0.01 times the average molar diffusion flow rate of the species between a conduit and the stationary phase made up by the packing under the effect of a same difference in concentration of the species to be separated between the fluid conveyed by the conduits and the wall of said conduits.

Preferably, the permittivity of said continuous medium towards species to be separated is greater than 5,000 Barrer, i.e. greater than $5.10^{-7}$ (cm$^3$ O$_2$ cm)/(cm$^2 \cdot$s cm Hg).

According to an embodiment, the diameter of the capillary conduits of the packing is less than or equal to 500 µm, preferably less than or equal to 150 µm and even more preferably less than or equal to 50 µm.

According to an embodiment, said continuous medium is formed with an organic gel, said organic gel being selected from among:
  (a) a copolymer of styrene and of divinylbenzene,
  (b) polymethyl methacrylate,
  (c) a copolymer of hydroxyethyl methacrylate and of divinylbenzene.

According to another embodiment, said continuous medium is formed with an organic gel, said organic gel being a polyholoside.

According to another embodiment, said continuous medium is formed with an organic liquid extending in said network of connected pores, said organic liquid being selected from among:
  (a) an aliphatic or aromatic hydrocarbon,
  (b) an aliphatic or aromatic alcohol,
  (c) an aliphatic or aromatic ketone,
  (d) an aliphatic or aromatic amine,
  (d) a halogenated organic compound.

The packing may comprise an organic gel monolith permeable to molecular diffusion through which extends said capillary conduits, said network of connected pores extending within said organic gel.

Alternatively, the packing comprises a monolith of a chemically inert porous material containing said network of connected pores, said pores being filled with said organic gel or with said organic liquid permeable to molecular diffusion.

Alternatively, the packing comprises a monolith of a chemically inert porous material containing said continuous network of pores, the surface of said pores being covered with an organic gel permeable to molecular diffusion over a thickness selected so as to leave, in said network of pores, a free volume for diffusion of the mobile phase, said organic gel forming a continuous network of pores between the conduits.

Preferably, the chemically inert material of said monolith is selected from silica, alumina, or a combination of silica and of alumina.

According to an embodiment, the packing comprises a stack of porous fibers each comprising a lumen forming a capillary conduit of the packing and a wall comprising a network of connected pores, said fibers being made contiguous with the porous organic gel or the organic liquid permeable to molecular diffusion.

The wall of each fibre may be formed with said organic gel permeable to molecular diffusion.

Alternatively, the pores of the wall of each fibre are filled with said gel or with said organic liquid permeable to molecular diffusion.

Alternatively, the surface of the pores of the wall of each fibre is covered with an organic gel permeable to molecular diffusion over a thickness selected so as to leave, in said network of pores, a free space for diffusion of the mobile phase, said organic gel forming a continuous network of pores inside said wall.

According to an embodiment, the organic gel permeable to molecular diffusion forms the chromatographic stationary phase.

Alternatively, the organic gel has pores containing a solid body third party forming the chromatographic stationary phase.

Another object of the invention relates to a method for manufacturing a packing for applying the chromatography method described above, comprising the following steps:
proving a bundle of so-called precursor threads of the capillary conduits,
forming a porous matrix around threads or conduits, so as to form a monolith,
removing the threads so as to form said capillary conduits.

The matrix is advantageously an organic gel.

Alternatively, the matrix comprises a chemically inert material and said matrix is loaded with an organic gel.

The precursor threads of the capillary conduits are advantageously threads which are meltable at a temperature less than the degradation temperature of the matrix and the removal of said threads comprises the melting and the draining of said threads out of the packing.

For example, the meltable threads comprise indium, bismuth, tin, gallium, silver or one of their alloys with other metals excluding lead, mercury and cadmium.

Another object of the invention relates to another method for manufacturing a packing for applying the chromatography method described above, comprising the following steps:
providing a compact bundle of hollow fibers,
including in the porous wall of the hollow fibers an organic gel or a precursor of said organic gel intended to be polymerized in situ, so as to leave the lumen free and open of the hollow fibers,
creating a diffusive connection between said hollow fibers with said organic gel or liquid.

Another object of the invention relates to another method for manufacturing a packing for applying the chromatography method described above, in which molding of the organic gel is achieved in a structure defining said capillary conduits.

Another object of the invention relates to a packing for chromatography, comprising:
a plurality of capillary conduits crossing the packing between a so-called upstream face intended for the entry of the phase into the packing and a so-called downstream face intended for the outflow of the mobile phase of the packing, and
a continuous medium permeable to molecular diffusion extending between said conduits, including a porous organic gel or an organic liquid and including at least a family of connected pores.

Advantageously, the diameter of the capillary conduits of the packing is less than or equal to 500 µm, preferably less than or equal to 150 µm and still more preferably less than or equal to 80 µm.

When the continuous medium is formed with an organic gel, said organic gel may be selected from among:
(a) a copolymer of styrene and of divinylbenzene,
(b) polymethyl methacrylate,
(c) a copolymer of hydroxyethyl methacrylate and of divinylbenzene.

Alternatively, the organic gel may be a polyholoside.

When said continuous medium is formed with an organic liquid extending into the network of connected pores, said organic liquid is selected from among:
(a) an aliphatic or aromatic hydrocarbon,
(b) an aliphatic or aromatic alcohol,
(c) an aliphatic or aromatic ketone,
(d) an aliphatic or aromatic amine,
(d) a halogenated organic compound.

According to an embodiment, the packing comprises an organic gel monolith permeable to molecular diffusion through which said capillary conduits extend.

According to another embodiment, the packing comprises a monolith of a chemically inert porous material having a continuous network of pores, said pores being filled with said gel or said organic liquid permeable to molecular diffusion.

According to another embodiment, the packing comprises a monolith of a chemically inert porous material having a continuous network of pores, the surface of said pores being covered with the organic gel permeable to molecular diffusion over a selective thickness so as to retain, in said network of pores, a free space for diffusion of the mobile phase, said organic gel forming a continuous network of pores between the conduits.

According to another embodiment, the packing comprises a stack of porous fibers each comprising a lumen forming a capillary conduit of the packing and a wall comprising a continuous network of pores, said fibers being made contiguous by the gel or organic liquid permeable to molecular diffusion.

The wall of each fiber may then be formed with said organic gel permeable to molecular diffusion.

Alternatively, the pores of the wall of each fiber are filled with said gel or with said organic liquid permeable to molecular diffusion.

SHORT DESCRIPTION OF THE DRAWINGS

Other features and advantages of the invention will emerge from the detailed description which follows, with reference to the appended drawings wherein:

FIG. 1 is a sectional view of a block diagram of a monolithic packing according to an embodiment of the invention in a plane parallel to the longitudinal axis of said packing, FIG. 2 is a sectional view of a block diagram of said packing in a plane perpendicular to the longitudinal axis of said packing, FIG. 3 is a sectional view of a block diagram of a multicapillary packing comprising a dimensionally stable porous backbone, the pores of which are covered with an organic gel permeable to molecular diffusion, FIG. 4 is a sectional view of a block diagram of a packing formed with a stack of hollow fibers according to an embodiment of the invention in a plane perpendicular to the longitudinal axis of said packing, FIGS. 5 and 6 are top and sectional views of a molded organic gel, FIG. 7 shows the efficiency of a multicapillary packing in which the wall of the conduits is non-porous (a) and porous (b).

FIGS. 8 and 9 show the diffusive flows between adjacent conduits and inside a same conduit.

FIGS. 10 and 11 explicit two alternative embodiments of a chromatography method.

Figure 14:
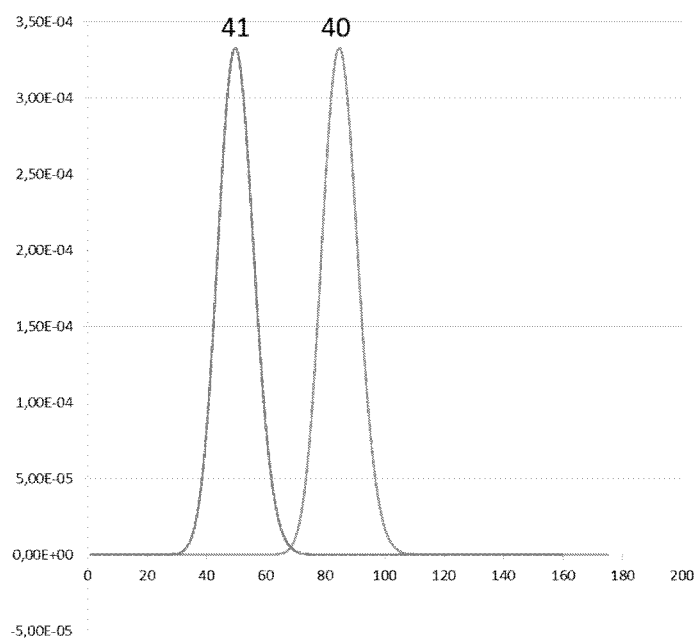

FIG. 14 schematically illustrates a computer simulation of the separation of two chemical species on a multicapillary packing with porous walls, the diameter of the communicating pores thereof being greater than twice the molecular diameter of these species.

Figure 15:
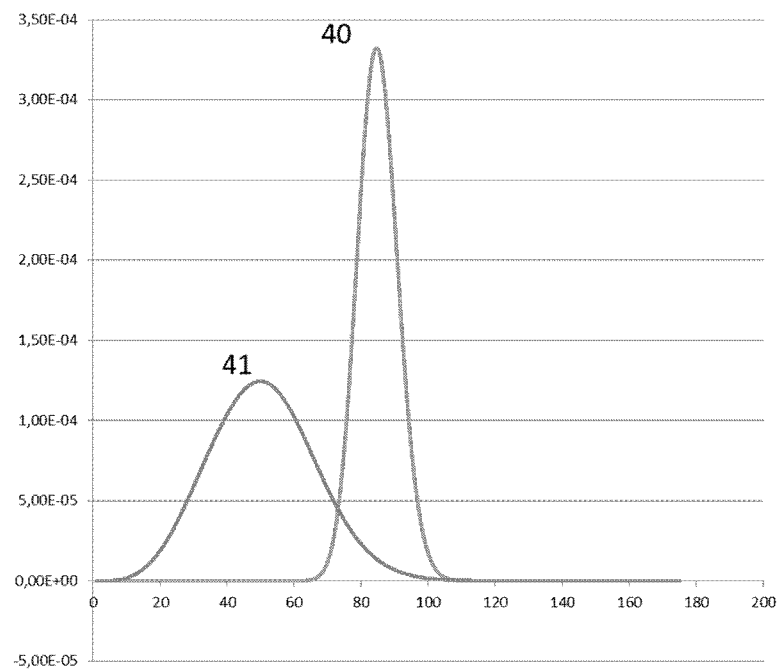

FIG. 15 schematically illustrates a computer simulation of the separation of the same chemical species on a packing having identical dimensional characteristics with those of the packing used for the simulation of FIG. 14 but for which the diameter of the communicating pores is less than twice the molecular diameter of one of these species.

Figure 23:
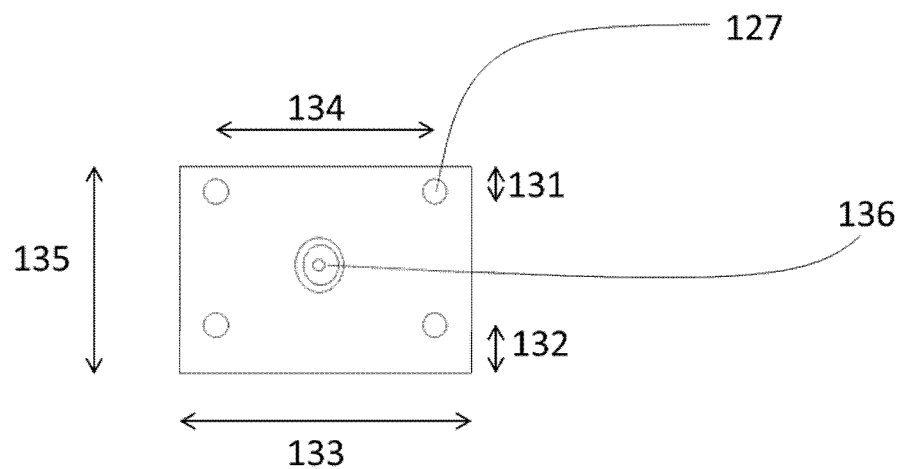
Figure 24:
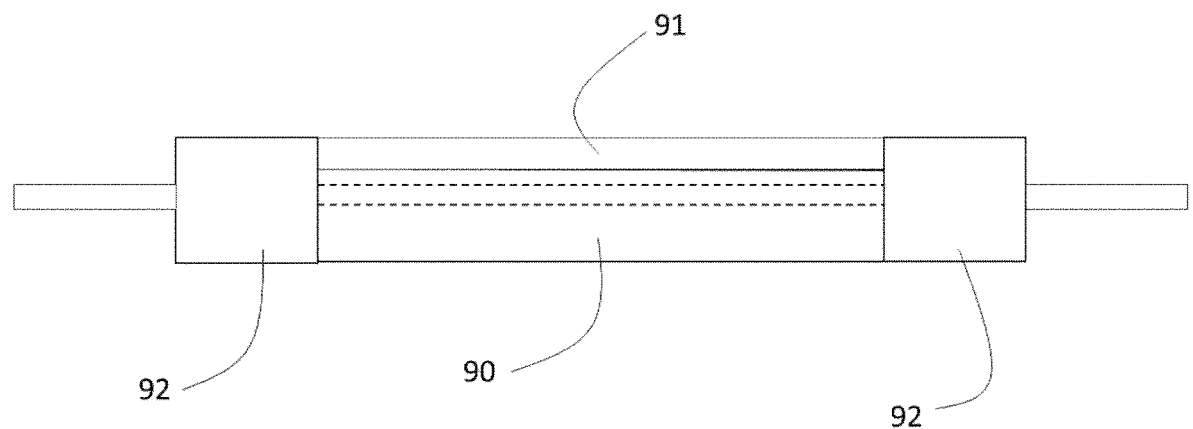
Figure 25:
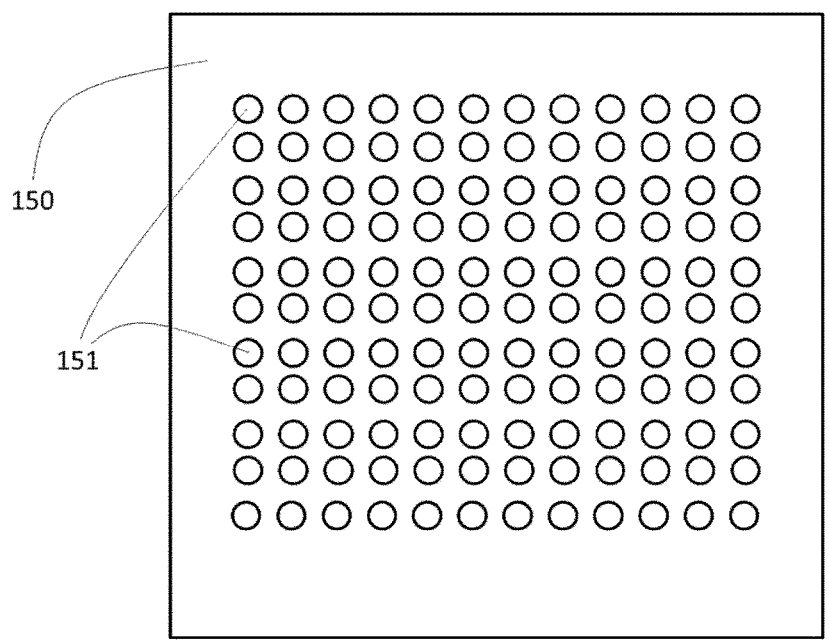
Figure 26:
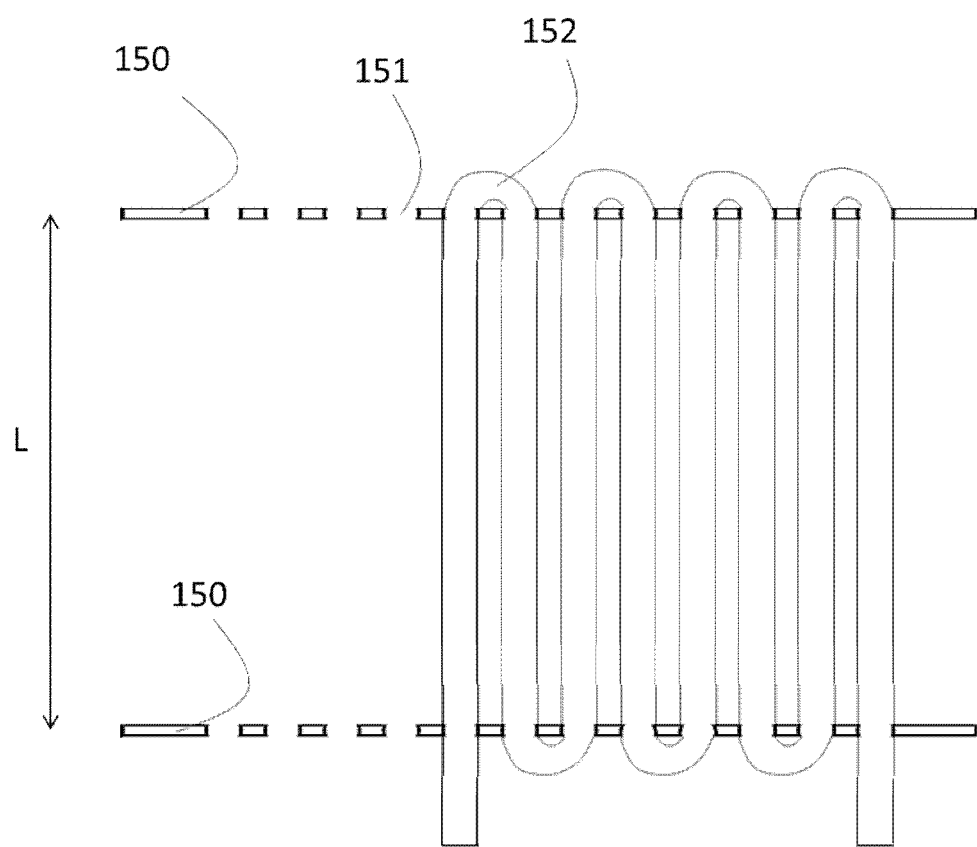
Figure 27:
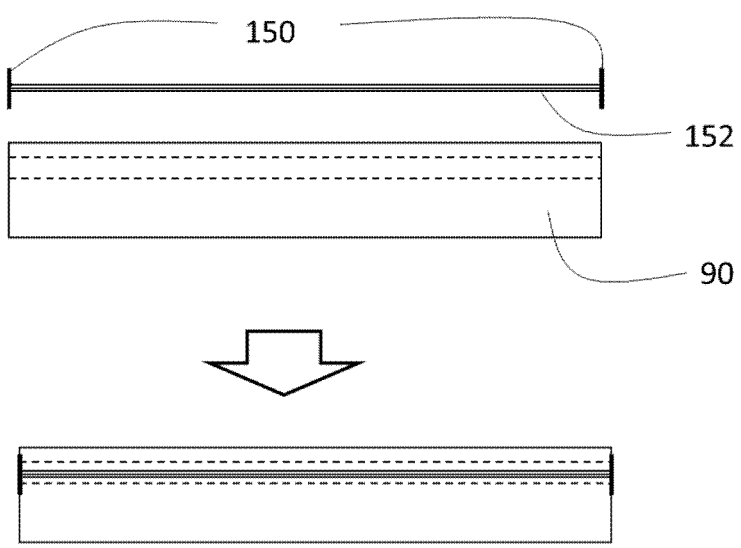

FIG. 16 illustrates a sectional view along a direction parallel to its major axis of an alternative of a packing for chromatography according to an embodiment of the invention wherein the conduits are included in a porous monolithic mass, FIGS. 17 to 24 are views of the construction of a chromatographic column, FIGS. 25 and 26 illustrate a method for assembling precursor threads of the conduits of a monolith, FIG. 27 schematically illustrates the assembling of the bundle of threads in the part 90.

Figure 28:
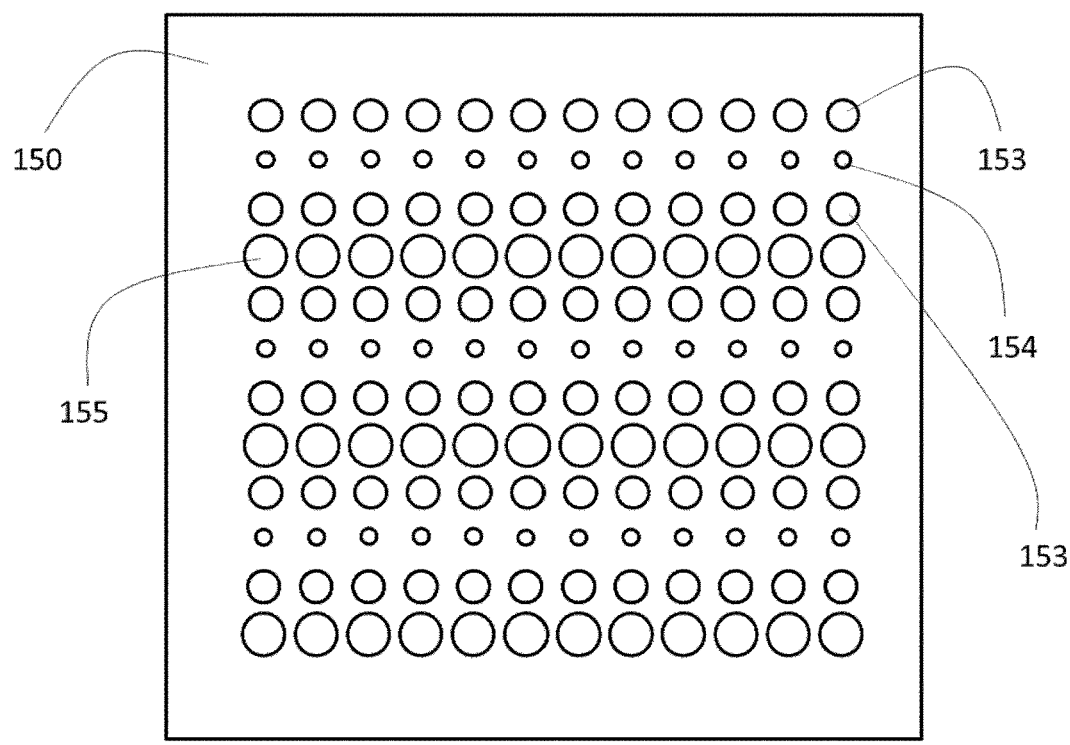

FIG. 28 illustrates a perforated sheet, the holes of which are distributed in layers with three different diameters.

Figure 29:
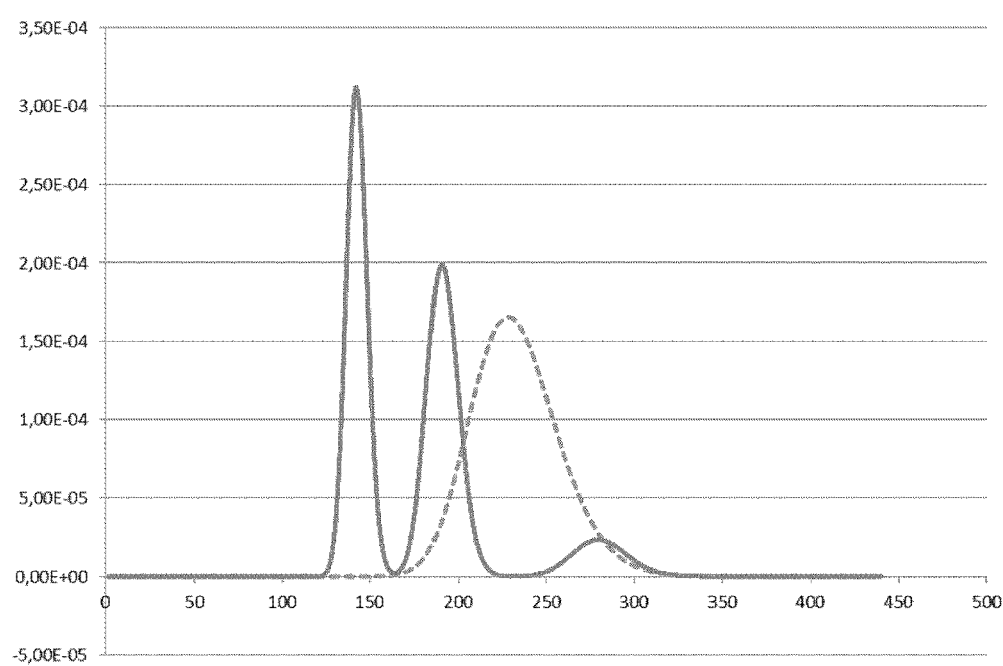
Figure 30:
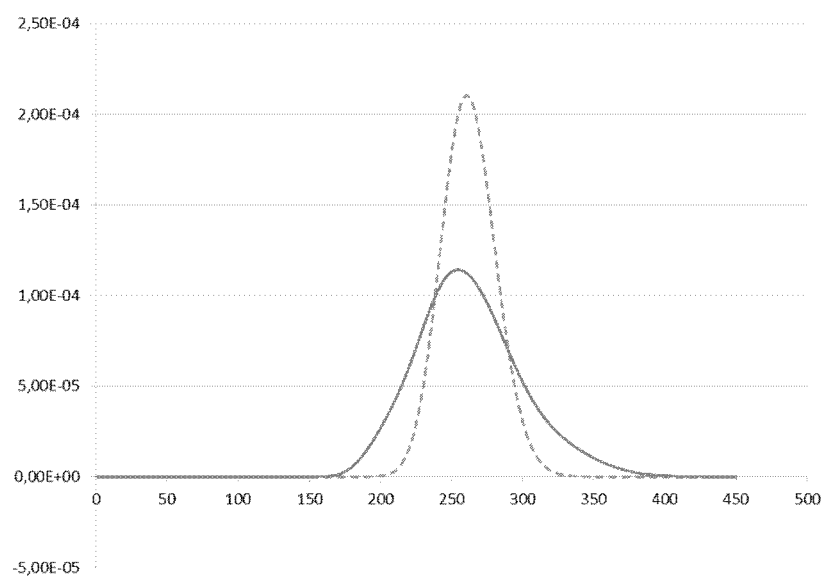

FIG. 29 illustrates chromatographic responses of a same column in the case when the eluted molecule is of a molecular diameter of less than twice the diameter of the pores giving the possibility of diffusion between the adjacent conduits (curve in dotted lines), and in the case when its molecular diameter, greater than twice the diameter of the pores, does not allow this (curve in solid lines), the column containing three ferries of conduits with different diameters arranged in superposed layers, FIG. 30 illustrates chromatographic responses of a same column in the case when the eluted molecule is of a molecular diameter less than twice the diameter of the pores allowing diffusion between the adjacent conduits (curve in dotted lines), and in the case when its molecular diameter, greater than twice the diameter of the pores, does not allow this (curve in solid lines), the column contains conduits for which the diameters are randomly distributed according to a Gaussian law for which the standard deviation corresponds to 5% of the mean diameter of the conduits.

FIGS. 31 to 34 illustrate chromatograms obtained by means of a device according to the invention.

DETAILED DESCRIPTION OF THE INVENTION

The chromatography method uses a stationary phase which appears as a packing for which different embodiments will be described hereafter and a mobile phase containing species to be separated.

Chromatography is a particular molecular separation method characterized in that it carries out a separation of a mixture of chemical substances under the contradictory action
of a dynamic carrying away of these species by a stream of an eluting phase
of a retention of these species by a stationary phase.

Preferably, this method is continued until complete elution of the separated species out of the stationary phase.

Two general categories of a chromatography method are distinguished, elution chromatography and affinity chromatography.

Figure 10:
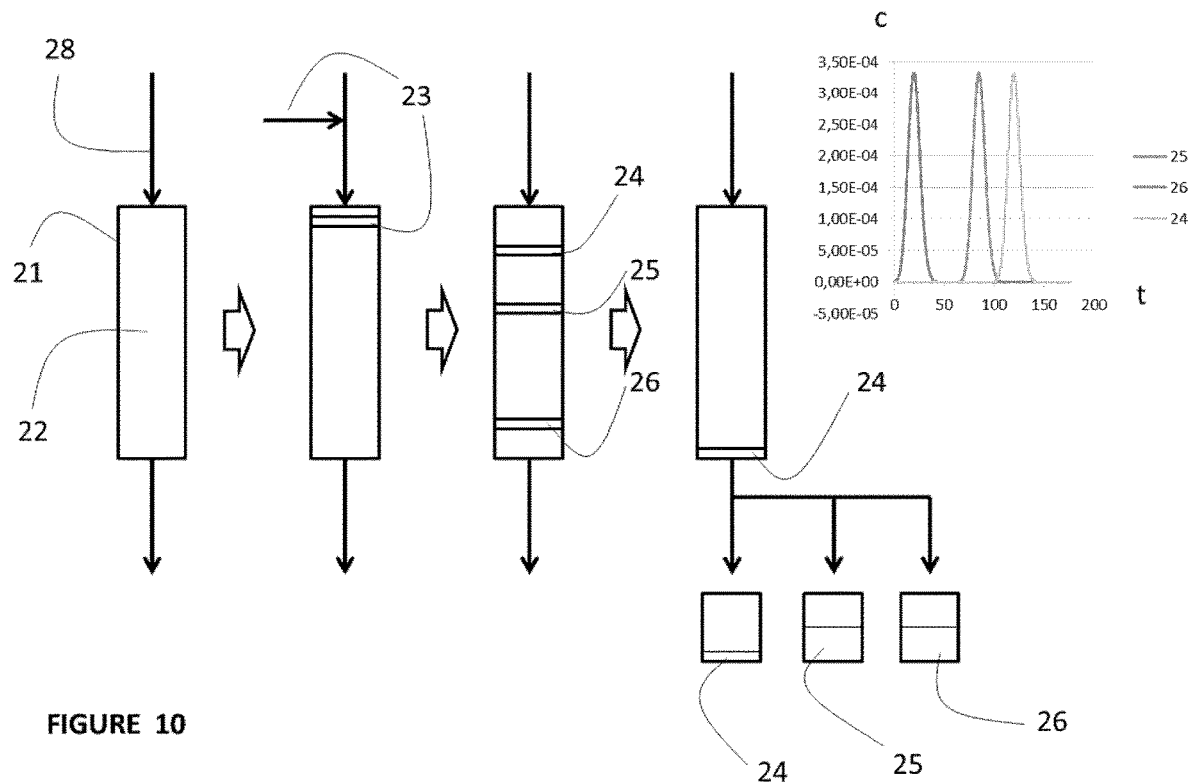

FIG. 10 describes an elution chromatography method. According to this method, a continuous flow of mobile phase 28 with an optionally variable composition and temperature over time crosses the chromatographic column 21 filled with a stationary phase 22. A load volume to be separated 23 is injected into the supply flow. Under the antagonistic effect of reversible retention of the chemical species by the stationary phase and of the elution or carrying away by the mobile phase, the species migrate at different velocities along the column 21 and separate into bands or elution peaks 24, 25, 26, etc. . . .

The separated species are isolated by fractionating the outflowing flow from the column so as to collect each band upon its exit from the column in the elution solvent.

This fractionation may be time-based in the case of a discontinuous or angular method in the case of a continuous annular device. It may consist in the separation of a head fraction and of a tail fraction for a device with a simulated mobile bed.

The chromatogram represents the concentration peaks of the species 24, 25, 26 at the column outlet versus time.

Figure 11:
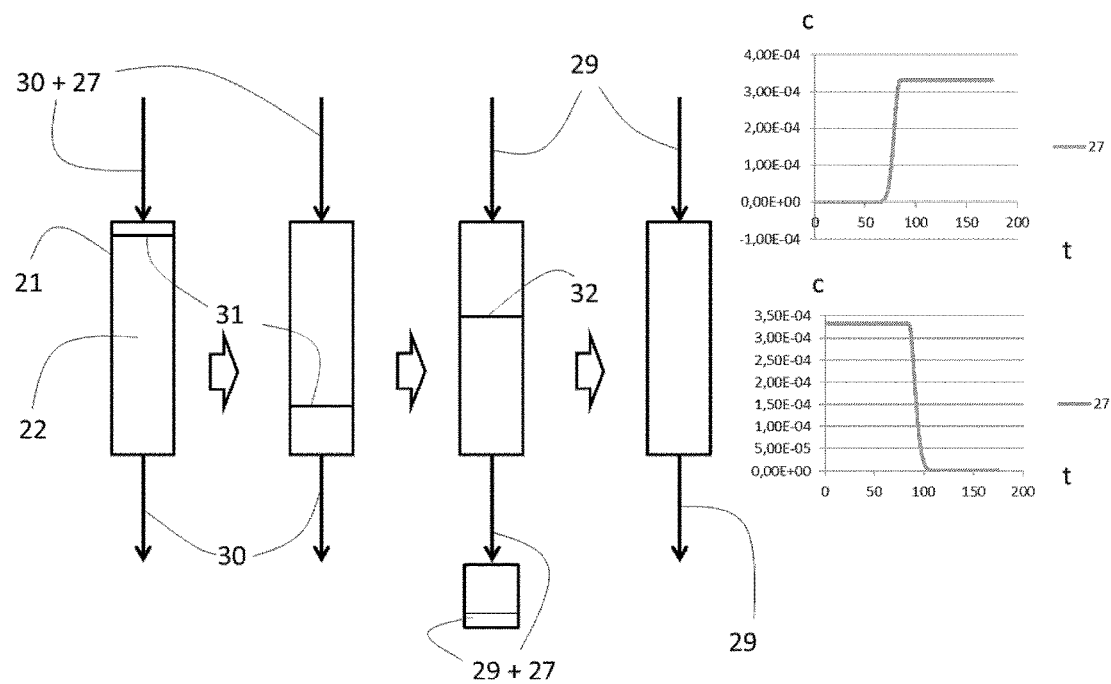

FIG. 11 describes an affinity chromatography method allowing the separation of biomolecules. A continuous solvent 30 flow containing the biomolecule to be separated 27 feeds the chromatographic column 21 filled with a stationary phase 22 having strong affinity for the biomolecule to be separated. Under the effect of this strong affinity, the molecule binds onto the stationary phase continuously until saturation of the latter. This binding is quasi irreversible under conditions of this first phase. The progression front 31 of the concentration in 27 is in this case a segment progressing towards the outlet. The column is saturated when the concentration in 27 become significant in the solvent at the outlet of the column.

During a second phase, the properties (pH, ionic force, etc. . . . ) or the nature of the elution solvent 29 are changed so as to reduce or remove the affinity of the biomolecule 27 for the stationary phase 22, and to solubilize the biomolecule in the solvent 29. The biomolecule 27 is eluted in the solvent 29 leaving the column 21 until depletion of the amount present in the latter. The column 21 is then regenerated and is ready for a new cycle.

The chromatograms represent concentration profiles of the species 27 at the outlet of the column versus time, during attachment and then elution phases.

Advantageously, the invention resorts to an elution chromatography method.

Elution chromatography may be conducted with any known technique, such as for example discontinuous chromatography on a column, radial or axial continuous annular chromatography, the simulated mobile bed.

Advantageously, the chromatography method applied may be an affinity chromatography method.

Advantageously, a chromatographic separation or a chromatography method will be characterized conveniently in that it comprises at least 300 theoretical stages, and preferably at least 1000 theoretical stages.

This differentiates it from separations with membranes, from catalytic processes and from separations by adsorption or ion exchange in particular.

It is advantageously possible to calculate the number of optimum NET theoretical stages of a method for a compound not retained by the formula:

$$NETMax = 1.61 * L/(Dh + e*P)$$

Wherein L is the length of the column, Dh is the average hydraulic diameter (arithmetic mean) of the conduits, e is the average thickness of the walls, P is the void fraction of the walls.

The chromatography applies in liquid, gas and supercritical phases.

The invention gives the possibility of optimizing the efficiency and the rapidity of a chromatographic process by selecting the morphology and the structure of the packing which is the most advantageous.

The invention relates to a chromatography method in which a mobile phase containing species to be separated is circulated through a packing, said packing comprising:
- a plurality of capillary conduits crossing the packing between a so-called upstream face through which the mobile phase penetrates into the packing and a so-called downstream face through which the mobile phase leaves the packing, and
- a continuous and connected medium permeable to molecular diffusion extending between said conduits, including a porous organic gel or an organic liquid and including a family of pores ensuring connectivity between said conduits.

The method therefore comprises material exchange between the mobile phase and a stationary phase, which may consist of the gel or the organic liquid itself or of a third party solid body contained in the porosity of the organic gel.

By "permeable to molecular diffusion", is meant that the conduits of the packing are connected through a continuous and connected phase including at least one porous organic gel and/or an organic liquid on the one hand and optionally a mobile phase on the other hand, and including a family of pores ensuring connectivity between said conduits.

Advantageously, the size of the pores of the continuous medium is greater than twice the molecular diameter of at least one species to be separated. Advantageously, when there exists several species to be separated, the size of the pores is greater than twice the molecular diameter of at least two species to be eluted sequentially, or even of all the species to be separated.

This feature gives the possibility of using the packing under optimum efficiency conditions. This is illustrated by FIGS. 14 and 15.

FIG. 14 schematically illustrates a computer simulation of the separation of two chemical species in a multicapillary packing with porous walls, for which the diameter of the communicating pores is greater than twice the molecular diameter of each of these species. The capillary conduits of the packing have statistical variability on their diameter. These diameters are distributed on a Gauss curve for which the standard deviation is equal to 5% of their average diameter.

These species are for example a mineral salt like sodium chloride 40 and a peptide 41 dissolved in water.

Good separation of the two elution peaks is ascertained giving the possibility of separating both species.

FIG. 15 schematically illustrates a computer simulation of the separation of the same chemical species on a packing having identical dimensional characteristics but for which the diameter of the connected pores is greater than twice the molecular diameter of the species 40 and is less than twice the molecular diameter of the species 41.

It is ascertained that both peaks overlap and no longer allow an efficient and complete separation of both species. This effect is due to the fact that the porous nature of the gel allows equilibration of the concentrations between the conduits by molecular diffusion in the case of species 40 and no longer allows this in the case of species 41. Consequently, the species 41 is subject to an additional significant spreading-out due to the irregular nature of the diameters of the capillary conduits which is no longer compensated by molecular diffusion between the adjacent conduits.

Therefore, in order to optimize the performances of the separation in the presence of two species (or more) having consecutive peaks, it will be ensured that the size of the connected pores is greater than twice the molecular diameter of each of said species.

The molecular diffusion is conventionally related to a difference of concentration and to the diffusion coefficient through Fick's law.

Advantageously, the size of the pores of the continuous medium is greater than 10 times the molecular diameter of the species to be separated.

Advantageously, the size of the pores of the continuous medium is greater than twice and less than 1,000 times the molecular diameter of the species to be separated.

Advantageously, the size of the pores of the continuous medium is greater than twice and less than 30 times the molecular diameter of the species to be separated.

Advantageously, the mobile phase penetrates the totality of the first population of connected pores so as to achieve a monophasic continuum of mobile phase between the conduits.

Advantageously, the molecular diffusion of the mobile phase among the conduits is carried out within said mobile phase continuum.

The significance of molecular diffusion is thereby increased among the conduits.

Advantageously, the continuous and connected phase connecting the conduits is a condensed phase.

Advantageously, the continuous and connected porous medium extending between the walls does not have any material interruption.

The porosity of the material may advantageously be defined in chromatography in three ways:
1. The porosity of an organic gel may stem from the swelling of a cross-linked gel in an organic, mineral or aqueous solvent, swelling advantageously representing more than 2% of its volume, and preferentially more than 10% of its volume.
2. It may stem from a porosity of the gel in the non-solvated state.
3. It may stem from the porosity of a support onto which a polymeric gel is deposited as a thin layer.

Within this definition of molecular permeability, it is advantageously meant that under the conditions of the chromatography method and for the species to be separated:
- on the one hand the average molar diffusion flow rate Phip between the adjacent conduits under the effect of a given difference of concentration of the species to be separated between the walls of said conduits.
- on the other hand, the average molar diffusion flow rate Phic between a conduit and the stationary phase making up the packing under the effect of a same difference in concentration of the species to be separated between the fluid conveyed through the conduits and the wall of said conduits, are close to each other.

By average flow rate, is meant that the flow rate is the average of this flow rate measured on the packing as a whole.

By convention, it will be considered that the molar diffusion flow rate Phic between a conduit and the stationary phase which forms the packing, is measured by imposing a uniform concentration at the wall Cs and by calculating the exchange towards the average concentration Ce of the fluid flowing through the conduit. This is expressed by a Sherwood number equal to 3.66 in the case of a tube of circular section in which flows a fluid in laminar flow. By close to each other, it is in particular meant that said molar flow rate of material transfer of the species to be separated between the adjacent conduits between their walls is at least 0.01 times, advantageously at least 0.1 times and even more advantageously at least 0.5 times the term of said molar flow rate related to the material transfer between the conduits and their stationary phase.

In the present text, the molecular diameter will be calculated in two ways depending on the molecular weight of the relevant substance.

For substances having a gas phase and for which the critical coordinates are accessible, the co-volume, the term b of the Van der Waals equation, divided by 4 and by the Avogadro number will be used and the diameter of a sphere with an equivalent volume will be calculated. Indeed it is known that the co-volume b is equal to four times the molecular volume. The co-volume is easily accessible from critical coordinates of the relevant body.

For macromolecules, biological molecules (proteins, etc. . . . ) and molecules for which the critical coordinates are inaccessible, the hydrodynamic diameter measured by dynamic light diffusion will be used.

The mobile phase is, under the application conditions of the method, in the gas, liquid state or in the supercritical state.

Preferably, the mobile phase is, under the application conditions of the method, in the liquid state or in the supercritical state.

In a more preferential way, the mobile phase is, under the application conditions of the method, in the liquid state.

Indeed, the efficiency of a packing increases proportionally with the density and with the diffusivity of the mobile phase which crosses it. In order to increase the efficiency of the packing, the density of the mobile phase crossing it is increased by operating in the vicinity of the critical point of said mobile phase or in the liquid state.

Moreover, the packing has sufficient solidity, rigidity and mechanical strength for allowing handling of the packing.

The packing may advantageously be applied on an industrial scale with pressure drops comprised between one and a few bars per meter.

The packing applied in the present invention is a porous packing which comprises a plurality of parallel capillary conduits which extend in the direction of circulation of the mobile phase, this direction being considered as the longitudinal direction of the packing. Such a packing is said to be "multicapillary".

These conduits may be seen as a set of anisotropic macropores distinct from the packing material which surrounds them and in which they are included, and in which the mobile phase flows in a convective way.

Advantageously, the conduits are rectilinear, cross right through the monolith and open in its upstream and downstream faces.

In such a packing, the capillary conduits are advantageously empty of any solid material while the material which surrounds the conduits is porous. In particular, at least the wall of the conduits has a continuous network of pores, said pores being open on the conduits.

The capillary conduits are advantageously rectilinear, even if it is not excluded that conduits have bends or angles.

The capillary conduits have a uniform section relatively to each other and over their length.

The section variability of the conduits will conveniently be defined by a relative standard deviation. This relative standard deviation represents the ratio of the standard deviation of the diameter of the conduits over the average diameter of the conduits, expressed as a percentage. Advantageously, the conduits have a substantially constant average diameter from one conduit to the other, such that the standard deviation of the diameter on the sample of conduits of the packing does not exceed 30% of the average diameter, preferably does not exceed 10% of the average diameter, and even more preferentially does not exceed 2.0% of the average diameter. In the present text, by average of a set of values of a variable X is meant its arithmetic mean E[X]. The standard deviation is defined as the square root of the arithmetic mean of $(X-E[X])^2$. By distribution, is meant in the present text a set of values of the variable X.

Advantageously, the diameter does not vary by more than 50% over the length of a same conduit.

Advantageously, the diameter does not vary preferably by no more than 20% over the length of a same conduit. Still more advantageously, the diameter does not vary by more than 10% over the length of a same conduit. Still preferably, the diameter does not vary by more than 2% over the length of a same conduit.

Advantageously, the conduits cross the packing right through, thereby giving the possibility of minimizing the pressure drop within the packing during the chromatographic separation method.

Advantageously, the volume of the capillary conduits represents more than 5% of the total volume of the packing, preferably more than 30% of said total volume and still more preferably more than 50% of the total volume of the packing. In the present text by "total volume of the packing" is meant the volume occupied by the packing, including its porosity and its conduits; said total volume may therefore be calculated from the external dimensions of said packing. The volume of the conduits is measured in the following way: number of conduits×average section of a conduit×average length of a conduit.

Advantageously, the volume occupied by the organic gel in the packing is greater than 2% of the volume of the packing excluding the conduits, preferably greater than 10% of said volume and even more preferably greater than 40% of said volume. By "volume of the packing excluding the conduits", is meant the difference between the total volume of the packing and the volume of the capillary conduits.

The conduits may have a section of any suitable shape, for example a circular, square, rectangular, hexagonal, star-shaped, slot-shaped form, etc. When the conduits have a non-circular section, by "diameter" of said conduits is meant their hydraulic diameter.

Advantageously, the conduits have a hydraulic diameter of less than or equal to 500 μm. According to an embodiment, the hydraulic diameter of the conduits is less than or equal to 150 μm, or even less than or equal to 50 μm. The hydraulic diameter is conventionally calculated as being equal to four times the section of a conduit (in $m^2$) divided by the perimeter of said conduit wetted by the mobile phase (in m).

For a liquid phase chromatography method, the conduits preferably have a diameter of less than 500 μm, very preferentially less than 30 μm, and even more preferentially less than 15 μm.

For a chromatography method in a supercritical phase, the conduits preferably have a diameter of less than 80 μm, preferably less than 30 μm, and still more preferentially less than 5 μm.

For a gas chromatography method, the conduits preferably have a diameter of less than 500 μm, preferably less than 250 μm, and even more preferentially less than 50 μm.

Indeed, liquid phase chromatography is carried out in a simple way in apparatuses subject to gravity, where the weight of the fluid column on the packing causes its flow.

The upper limit of the diameter of the capillaries will be obtained when the flow of the fluid at the velocity allowing the optimum of the efficiency of the packing will cause a pressure drop equal to the weight of the relevant fluid column over the height of the bed.

It is known that for a multicapillary packing at the optimum efficiency:

$$\frac{V_C * d_C}{D_0} = V_R$$

The Poiseuille law is written as $$\Delta P = \frac{32 * \mu * LG * v_C}{d_C^2}$$

The pressure caused by the fluid height LG is written as $$\Delta P = \rho * g * LG$$

The result of this is that:

$$d_{max} = \sqrt[3]{\frac{32 * \mu * D_0 * V_R}{\rho * g}}$$

The table below exemplifies $d_{max}$ for different liquids common in chromatography.

| solvent | μ (Po) | Do (m2/s) | $V_R$ | ρ (kg/m3) | dmax (μm) |
|---|---|---|---|---|---|
| Water | 0.001 | 1E−09 | 5 | 1000 | 25.3869139 |
| Hexane | 0.00031 | 3E−09 | 5 | 659 | 28.4754613 |
| Methanol | 0.00055 | 2E−09 | 5 | 791 | 28.3363475 |
| Chloroform | 0.00057 | 2E−09 | 5 | 1480 | 23.2716977 |

$V_R$ is generally comprised between 2 and 5.

In a simplified way the value of 50 μm may be assumed as the upper cutoff threshold of the diameter of the conduits giving the possibility of usefully benefiting from the advantages of multicapillary chromatography. In the same simplified way, the value of 80 μm may be assumed as an upper cutoff threshold of the inner diameter of the conduits taking into account the thickness of the stationary phase.

In these formulae, $V_c$ is the velocity of the mobile phase in the conduit, $d_c$ is the average inner diameter of the conduit, $D_0$ is the diffusivity of the species to be separated in the mobile phase, μ is the viscosity of the mobile phase, ρ is the density of the mobile phase, LG is the length of the column, g is the acceleration of gravity, ΔP is the pressure drop of the fluid in the conduit, $d_{max}$ is the maximum admissible average inner diameter for chromatographic separation. All these quantities are expressed in the SI unit system.

Advantageously, the conduits are distributed over a single mode, i.e. around a single average diameter.

Without leaving the scope of the invention, the diameter of the conduits may however be distributed over several modes, and in particular over two modes. Known laws relating averages and variances of several populations may be applied so as to observe the previous numerical constraints relating average and relative standard deviation.

Moreover, the conduits may be regularly positioned along a regular square or triangular axial mesh. By this is meant that the axes of the conduits are positioned at the apices of closely stacked squares with substantially constant sides or of equilateral triangles closely stacked with substantially constant sides.

Finally, the relative standard deviation of the thickness of the wall separating two adjacent conduits measured over a section of the packing is preferably less than 30%, even more preferentially less than 10%, and even more preferentially less than 2.0%. In this case, the relative standard deviation characterizes the ratio between the standard deviation of the thickness of the wall and its average, expressed in %.

Advantageously, the packing may have any specific surface area comprised between 0.1 and 1,200 m$^2$/g.

Advantageously, when the packing comprises a porous monolithic organic gel, acting as a stationary phase by adsorption on its porous surface, this surface will preferably be greater than 60 m$^2$/g, and even more preferentially comprised between 80 and 600 m$^2$/g. This surface may be a crude surface or modified by a chemical surface treatment.

Advantageously, when the packing comprises an organic gel supported by an underlying structure and acting in its bulk by penetration of the molecules to be separated into its volume, the supporting structure of the organic phase will have a specific surface area preferably less than 60 m$^2$/g, preferably less than 20 m$^2$/g, and even more preferentially less than 2 m$^2$/g.

Advantageously, the average pore size of the walls of the conduits of the packing will be comprised between a few Angstroms and a few hundred nanometers according to the needs and to the used type of chromatography.

The porous volume of the walls of the packing will advantageously be comprised between 0 cm$^3$/g (such is the case when the walls of the packing are filled with a liquid stationary phase for example) and several cm$^3$/g (case of the present monolithic polymeric stationary phases of the PS-DVB type for example).

As discussed above, the invention applies a packing which comprises a gel or an organic liquid permeable to molecular diffusion.

This gel or organic liquid may be the constitutive material of the packing, or else only form a portion of the packing, for example as impregnation of the porosity of a porous material of a different nature or as a coating layer deposited on a porous material of different nature so as to cover the pores of said material.

According to an embodiment, the packing is a monolith formed with said organic gel. In this packing, the organic gel forms a continuous backbone defining a continuous network of pores extending between the conduits and open on the conduits.

According to another embodiment, the packing is a monolith comprising a porous backbone formed with a material other than an organic gel and for which the pores are filled with a gel or an organic liquid. Thus, the gel or the organic liquid forms a continuous medium permeable to molecular diffusion extending between the conduits.

According to an alternative, the packing is a monolith comprising a porous backbone formed with a material other than an organic gel and for which the surface of the pores is covered with an organic gel film, so that the pores of the material contain a residual volume without any organic gel, free for diffusion of the mobile phase.

According to another embodiment, the packing comprises a stack of porous and hollow fibers. Each fiber comprises a lumen forming a capillary conduit and a wall comprising a continuous network of pores.

Advantageously, these fibers are stacked in a compact way so as to occupy more than 60% of the total volume of the packing, and preferably more than 80% of the total volume of the packing.

According to an embodiment, each fiber consists of an organic gel.

Alternatively, each fiber is covered or impregnated with an organic gel.

Preferably, said fibers are made contiguous by means of the gel or organic liquid permeable to molecular diffusion.

As compared with packings consisting of a porous mass of organic gel without any capillary conduits, a multicapillary packing of organic gel has, at equal efficiency, a pressure drop which is clearly smaller (by the order of 10 to 30 times less).

Therefore, the formation of capillary conduits in the packing gives the possibility of compensating for the relatively low mechanical strength of the packing in organic gel by reduction of the pressure drop and therefore obtaining moderate mechanical stresses exerted on the packing during the chromatography method.

In order to ensure good mechanical cohesion of the packing, the capillary conduits are advantageously secured mechanically by means of a continuous solid medium between the conduits and containing a gel or organic liquid permeable to molecular diffusion. This continuous medium generates a link between the conduits which allows molecular diffusion to be carried out freely between adjacent conduits.

As this will be discussed below, the application of a diffusive exchange between the conduits gives the possibility of increasing the number of theoretical plates available for a chromatographic separation method, and thus increase the efficiency of such a method.

The application of a diffusive exchange between the conduits gives the possibility of leveling the differences in behaviors between individual conduits. It is therefore necessary to increase the intensity of these exchanges in order to obtain an increase in the efficiency measured in terms of available theoretical plates.

The increase in this efficiency is expressed by a more significant resolving power of the packing towards a given mixture. A mixture of species with very close properties may be resolved more easily, and these species separated with a greater degree of purity.

In so far that the organic gel is subject to some swelling between the dry state and the wet state, it is advantageous, in order to avoid variations in diameter of the conduits, to reinforce the organic gel by means of a dimensionally more stable structure than said organic gel.

By "dimensionally stable structure" is meant a structure having little or no mechanical deformation under the conditions of use of the packing. In particular, this structure does not have any notable swelling effect in the presence of the characteristic eluting solvents of a chromatography method in a liquid or supercritical phase, said swelling remaining advantageously less than 10% of the total volume of the packing, and preferably less than 2% of said total volume.

A dimensionally stable structure which may be used for obtaining a packing adapted to the application of the invention comprises a volume as porous as possible intended to be used as a reservoir for the gel or organic liquid. Said porous volume is preferably greater than 20% of the volume of the packing excluding the conduits, advantageously greater than 40% of this volume, and still more advantageously greater than 60% of this volume.

Advantageously, such a dimensionally stable structure has a chemically inert surface and a low specific surface area in order not to interfere with the chromatography method taking place in the organic gel. Advantageously, this specific surface area will be less than 20 $m^2/g$, preferably less than 2 $m^2/g$, and still more preferentially less than 0.2 $m^2/g$.

According to an embodiment, the dimensionally stable structure is a woven fabric or a non-woven fabric in a mineral or organic material. Advantageously, this fabric is in one or several structural fibers like glass fiber, carbon fiber, aramide fiber, metal fiber or one of their mixtures. In order to form said structure, a weaving technique is advantageously used: precursor fibers of the conduits (i.e. having an outer diameter equal to the diameter of the conduits and intended to be subsequently destroyed for forming the conduits) are woven as a weft and structural fibers are arranged as a warp, or vice versa. The fabric is shaped, for example rolled or stacked. It is impregnated with a precursor liquid of the organic gel or of a porous matrix of another material. The precursor liquid is polymerized and the porous matrix is bound so as to give the assembly an optimum mechanical strength. The structural fiber ensures the support of the stresses related to the swellings of the material and improves its durability and its dimensional stability in operation.

Alternatively, the dimensionally stable structure is a bundle of fibers in a mineral or organic material.

According to another embodiment, the dimensionally stable structure is a reinforcement load like fibers, microfibers, nano-fibers either cut or milled, precipitated silicas, kieselguhr, etc. From among the cut, chopped or milled fibers, fibers of polyolefins, of glass, of silica, of aramides, of metal will be noted.

According to an embodiment, the dimensionally stable structure forms the rigid backbone of the packing. This dimensionally stable structure may be a multicapillary monolithic porous structure like a monolith in ceramic, in metal or in polymer. From among the possible ceramics, mention will be made in particular but in a non-limiting way of titanium oxide, zirconium oxide, aluminas, aluminosilicates, cordierite, mullite, silica, glass, metal silicates like zinc, magnesium, calcium, aluminium, titanium, zirconium silicates, etc. or aluminosilicates of these metals. These monoliths may be obtained by known methods, for example by extrusion and sintering. However these methods by extrusion are poorly adapted for producing conduits with a diameter of less than 0.8 to 1.2 mm and are therefore not very efficient towards diffusive phenomena, in particular they will not be very productive.

Advantageously, said monoliths are obtained by any of the methods described in the applications WO 2011/114017 and WO 2013/064754 of Parmentier.

Such monoliths advantageously comprise a volume as porous as possible in order to be used as a reservoir for the gel or organic liquid, preferably greater than 20% of the volume of the packing excluding the conduits, advantageously greater than 40% of this volume, and even more advantageously greater than 60% of this volume.

Multicapillary monoliths for producing the invention will be advantageously based on networks of organic or mineral polymers.

Multicapillary monoliths for producing the invention will advantageously be based on networks of highly cross-linked polymers or on porous silica or alumina networks or one of their combinations. These networks may be produced in the same way as the packings presently called monolithic packings for chromatography, which are non-multicapillary macroporous monoliths of high porosity.

By a combination of silica and alumina, is meant any formulation mainly containing silica and alumina in a combined form, or as a mixture, or simultaneously in a combined form and as a mixture. In particular, the multicapillary monolith may consist of a bimodal silica. This bimodal silica consists of a three-dimensional mesoporous porous backbone in which is included a volume of interconnected macropores. In this case, the organic gel is optionally occluded in the volume of the mesopores.

By "mesopores", are meant pores for which the diameter is comprised between 2 and 50 nanometers; by "macropores" are meant pores for which the diameter is greater than 50 nanometers; by "micropores" are meant pores for which the diameter is less than 2 nanometers.

The sizes of pores mentioned in the present text are measured according to two different techniques depending on the nature of the tested material: when this is a mineral material and in particular silica, the employed technique is porosimetry with mercury for macro- and meso-porosity, and nitrogen adsorption for microporosity; when these are polymeric materials or based on mineral matrices covered with organic gels, porosimetry with mercury is used for the macroporosity and the porosimetry by nitrogen adsorption for mesoporosity and microporosity.

According to an embodiment, the organic gel covers the backbone of the mesopores. The volume of the macropores remains advantageously open and interconnected so as to ensure free diffusion of the species contained in the mobile phase in the bulk of the monolith.

Advantageously, the volume of the mesopores and macropores is increased.

It is also possible to stabilize a supporting monolith in silica by precipitation or adsorption of zirconium oxide on its surface so as to make it stable at an alkaline pH. Advantageously, as a support of the organic gel or of the organic liquid bimodal silicas are used for which the volume of the mesopores is comprised between 10% and 40% of the total porous volume.

Advantageously, as a support of the organic gel or of the organic liquid, bimodal silicas are used, for which the volume of the macropores is comprised between 60% and 90% of the total porous volume.

When the organic gel is included in a porous structure, it may consist of molecules with a low molecular weight, advantageously less than 1,000 g/mol, even more advantageously less than 500 g/mol, and still more preferentially less than 150 g/mol. These substances of low molecular weights may in this particular case be organic liquids. In the case of the liquid phase chromatography, the organic liquids which may be used an organic gel for applying the invention will in particular be aldehydes, ketones (methyl ethyl ketone, methyl isobutyl ketone, methyl cyclohexanone, dimethyl cyclohexanone), esters (cyclohexyl acetate, furfuryl acetate, amyl acetate), ethers (2-chloro-2-methoxy diethyl ether, diisopropyl ether) of aliphatic and aromatic hydrocarbons (hexane, dodecane, and benzene, toluene), alcohols (iso-butanol, pentanol, octanol, dodecanol, methyl cyclohexanol, 2-ethyl hexanol), carboxylic acids (octanoic acids, naphthenic acids). Other organic liquids may be used, such as tributyl phosphate, trioctyl phosphate, trioctyl phosphine oxide, esters of phosphonic acid, dimethyl phthalate, diethyl oxalate, arylsulfonic acids, hydroxyoximes, derivatives of oximes, beta-diketones, alkylaryl sulfonamides, primary, secondary, tertiary, quaternary amines, etc. . . .

An advantage of the organic liquids relatively to the organic gels is their very homogeneous ageing, which gives the possibility of maintaining a homogeneous chromatography method within the packing even when the latter is subject to ageing.

Such ageing is notably due to the presence of contaminating particles. Unlike organic gel, the organic liquid allows diffusion of such particles in its bulk so as to obtain a regular distribution within the liquid.

When the method is used for separating biological molecules, for example proteins, the organic liquid preferably contains nanometric micelles of aqueous solutions stabilized in the less polar phase by surfactants, called reversed micelles. These reversed micelles are provided with a certain electrostatic charge depending on the pH which may give the possibility of solubilizing a protein of opposite charge. Within the scope of a chromatography method, when the products to be separated are proteins and that the immobilized organic phase contains such reversed micelles, the pH of the mobile phase is adjusted so that these reversed micelles solubilize a particular protein. After having separated the proteins of electrostatic charges substantially similar (as not being soluble in the reversed micelles), the solubilized protein in the reversed micelles may be eluted by changing the pH of the mobile phase.

In the case of the gas chromatography, the organic liquids which may be used for applying the invention will in particular be polysiloxanes, including methyl, benzyl, trifluoropropyl, cyanopropyl radicals etc., polyethylene glycols, etc.

The organic gel is sufficiently permeable for allowing high diffusivity of the species of the mobile phase between the different neighboring conduits. Thus the efficiency of a chromatography method is thereby considerably increased by leveling the differences in behavior of slightly different capillary conduits in diameter, in wall thickness, etc., by molecular diffusions between neighboring conduits.

According to an embodiment, in the mass of the organic gel or around the organic gel a continuous network of connected pores is generated for this purpose. These connected pores consist of mesopores, mesopores and macropores, or macropores.

Advantageously, these pores belong to at least two independent networks of mesopores and macropores.

Preferably it is ensured that the porous volume of the packing containing the organic gel is greater than 20%, preferably greater than 40% and still more preferentially greater than 60% of the total volume of the packing excluding the volume of the conduits.

Advantageously although not exclusively, it is ensured that the organic gel contains macropores with a size greater than 50 nanometers. These macropores give the possibility to the molecules of the solvent and to some of them in the load to be rapidly diffuse into the organic gel.

According to a particularly advantageous embodiment of the invention, the walls of the packing include a volume fraction free of organic gel or liquid and, if required, of stationary phase. This fraction gives the possibility of being used as volume reserves towards swelling phenomena undergone by the organic gel in contact with a solvent or solutes by releasing the induced mechanical stresses and by ensuring the integrity and the dimensional permanency of the diameter of the conduits. Indeed, the swelling phenomena of the organic gel are absorbed and macroscopically compensated with this empty volume in the internal volume of the walls of the conduits and does not have any effect on the volume provided for the flow of the mobile phase.

Advantageously, this empty volume fraction is accessible to the stationary phase.

Advantageously, this empty volume fraction represents more than 5% by volume of the organic gel, preferentially more than 10% by volume of the organic gel, and still more preferentially more than 25% by volume of the organic gel. This phenomenon is in a particularly advantageous way used in a combination with a reinforcement of the organic gel with a dimensionally stable structure.

Indeed, the dimensionally stable structure ensures constancy in the geometrical dimensions of the packing and in particular of the diameter of the conduits, by supporting the mechanical stresses associated with the swelling phenomena or of withdrawal of the organic gel during its cycles of use. These withdrawal and swelling phenomena are thereby entirely rejected towards the porous volume of the organic gel. The increase or the reduction in the volume of the organic gel related to solvation differences are entirely reflected on a reduction or an increase in its porous volume by keeping constant the dimensions of its macroscopic envelope and in particular the diameters of the conduits.

For this purpose, it is possible to deposit the organic gel as a thin layer on a porous support.

This deposit may be achieved with any technique known to one skilled in the art like soaking of the dimensionally stable structure in a solution of the organic gel in a solvent, or in a solution of a precursor of the organic gel. The drainage of the structure and the evaporation of the solvent leave over the whole extent of the internal wall or specific surface area of this structure a thin layer of organic gel or of a precursor of the organic gel which may be polymerized or cross-linked in situ.

This thin layer of organic gel leaves free an empty porous volume of organic gel.

Advantageously, this free porous volume is continuous and connected, i.e. its pores communicate with each other. This porous volume accessible to the mobile phase allows efficient diffusion of the dissolved molecules between adjacent conduits.

According to an embodiment, the organic gel is deposited as a thin layer on the backbone of a bimodal silica structure or of an organic monolith. Said thin layer has a micrometric or submicrometric thickness.

Said layer thin may be deposited in a sufficient amount for covering the backbone of the monolith, but in an insufficient amount for filling the volume of the macropores. In particular, it is deposited so as to retain a connected and continuous volume of macropores in the packing and between the conduits. Such a deposition may be carried out for example by filling the macropores and the mesopores with precursors of the organic gel in the dissolved state in a volatile solvent and by evaporating the solvent uniformly before optional cross-linking of the organic gel in situ.

The deposit may take place in the whole bulk of the structure or only on a portion of the latter. In particular, it may consist in a layer of organic gel deposited on its surface as well as on the wall of the conduits.

In order to give a polymeric organic gel the required porosity, the polymerization may be conducted in the presence of a pore-forming agent which is subsequently removed. This pore-forming agent may be a solvent or a body removed subsequently by dissolution, evaporation or chemical etching like a macromolecule or a silica or alumina gel. When this is a solvent, it will lead to the precipitation of the organic gel during its polymerization. When this is a macromolecule, it may in particular be used for aggregating or coacervating together particles of polymeric organic gel.

The pore-forming agent may in particular be an organic solvent or water. For example it is possible to use organic solvents like alcohols, esters, ethers, aliphatic and aromatic hydrocarbons, ketones, di-, tri-, tetra-ethylene glycols, butanediols, glycerols, etc. Among heavy pore-forming solvents, mention will be made of tetrahydronaphthalene, decahydronaphthalene, anthracene, biphenyl, paraffinic oils, stearic, oleic, palmitic acids, dialkyl phthalates, camphor and its esters, dodecanol-1, octanol-1, cyclohexanol or a mixture thereof.

The amount of pore-forming agent may vary between 10 and 90% and preferentially between 20 and 60% by volume of the final mixture comprising the monomers.

The pore-forming agent has an influence on the final distribution in terms of pore sizes.

According to an embodiment, the dimensionally stable structure is bound to the polymeric organic gel through chemical bonds, notably covalent bonds. Advantageously, these covalent bonds are produced by grafting on the surface of the dimensionally stable structure of a coupling agent able to react with the organic gel before, after or during its cross-linking or its polymerization. Said coupling agent may comprise vinyl, acrylic or methacrylic bonds for coupling to the vinyl, styrenic or acrylic gels. Advantageously, this coupling agent comprises alcohol groups, and more advantageously ose or holoside molecules for coupling with polyholosides such as dextran or agarose during their cross-linking. From among the coupling agents which may be used, mention will inter alia be made in a non-limiting way of dodecyltrimethoxysilane, octadecyltrimethoxysilane, methyltrimethoxysilane, n-octyltriethoxysilane, n-octyltrimethoxysilane, n-propyltrimethoxysilane, n-propyltriethoxysilane, methyltriacetoxysilane, ethyltriacetoxysilane, vinyltriacetoxysilane, vinyltri(2-methoxyethoxy)silane, 3-chloropropyltriethoxysilane, 3-chloropropyltrimethoxysilane, 3-chloropropylmethyldimethoxysilane, 3-aminopropyltriethoxysilane, 2-aminoethyl-3-aminopropyltrimethoxysilane, 3-aminopropyltrimethoxysilane, bis(trimethoxysilylpropyl)amine, 3-ureidopropyltrimethoxysilane, 3-glycidoxypropyltrimethoxysilane, 3-glycidoxypropylmethyldimethoxysilane, 3-methacryloxypropyltrimethoxysilane, 3-methacryloxypropylmethyldimethoxysilane, bis(3-triethoxysilylpropyl)tetrasulfide, bis(3-triethoxysilylpropyl)disulfide, 3-mercaptopropyltrimethoxysilane, 3-mercaptopropylmethyldimethoxysilane, vinyltris(methylethylketoxime)silane, vinyloximinosilane, methyltris(methylethylketoxime)silane, methyloximinosilane, tetra(methylethylketoxime)silane, trifluoropropylmethyldimethoxylsilane, silanes containing epoxy bonds, etc.

As mentioned earlier, by "permeable to molecular diffusion", is meant that the conduits of the packing are bound with a continuous and connected phase including at least one porous organic gel and/or an organic liquid one the one hand and optionally a mobile phase on the other hand, and including a family of pores ensuring connectivity between said conduits.

Advantageously, the size of the pores of the porous medium is greater than twice the molecular diameter of the species to be separated.

Advantageously, the continuous and connected phase binding the conduits is a condensed phase.

Advantageously, the continuous and connected porous medium extending between the walls does not have any material interruption.

The porosity of the material may be advantageously defined in chromatography in three ways:
1. The porosity of an organic gel may stem from the swelling of a cross-linked gel in an organic, mineral or aqueous solvent, a swelling advantageously representing more than 2% of its volume, and preferentially more than 10% of its volume.
2. It may stem from a porosity of the gel in the non-solvated state.
3. It may stem from the porosity of a support on which a polymeric gel is deposited as a thin layer.

Within this definition of molecular permeability, it is meant advantageously that under the conditions of the chromatography method and for the species to be separated:
the average diffusion molar flow rate Phip on the one hand between the adjacent conduits under the effect of a given difference in concentration of the species to be separated between the walls of said conduits
the average diffusion molar flow rate Phic on the other hand between a conduit and the stationary phase which the packing forms, under the effect of a same difference in concentration of the species to be separated between the fluid conveying through the conduits and the wall of said conduits are close to each other.

By convention, it will be considered that the diffusion molar flow rate Phic between a conduit and the stationary phase formed by the packing is measured by imposing a uniform concentration at the wall Cs and by calculating the exchange relatively to the average concentration Ce of the fluid flowing through the conduit. This is expressed by a Sherwood number equal to 3.66 in the case of a tube with circular section through which flows a fluid in laminar flow.

By close to each other, is in particular meant that said material transfer molar flow rate of the species to be separated between the walls of the adjacent conduits is at least 0.01 times, advantageously at least 0.1 times and even more advantageously at least 0.5 times the term of said molar flow rate related to the material transfer between the conduits and their stationary phase.

By average flow rate is meant that said flow rates are calculated for an average conduit diameter and an average wall thickness of the packing, said averages being arithmetic means.

This amounts to expressing in other terms that the term of conductance related to the material transfer between the adjacent conduits at their wall is at least 0.01 times, advantageously at least 0.1 times and even more advantageously at least 0.5 times the term of conductance related to the transfer of material between the conduits and their stationary phase.

Let us recall that $$Sh=k*D/Diff$$

k is the material transfer coefficient, D is the diameter of the conduit, Diff is the diffusion coefficient.

The material transfer molar flow rate Phi per unit surface of the wall of the conduit is inferred therefrom:

$$Phic=k*(Cs-Ce)$$

Advantageously, this value is measured on the components of the mixture to be separated under the conditions of the separation or of the chromatography method.

In order to determine the permittivity or the effective diffusivity of an actual wall structure, and to calculate a molar diffusion flow rate Phip in the wall separating adjacent conduits, and the diffusion flow rate between a conduit and its wall containing the stationary phase Phic, we will resort preferably to a computer simulation including all the morphological, geometrical and constitutive, physical and physico-chemical details of said wall and of the packing. Software packages like COMSOL multiphysics give the possibility of easily achieving such performances.

The input data of such a simulation are essentially
the porous fractions filled with mobile phases in the wall, the tortuosity and the average pore size and the pore size distribution of these porous fractions as well as the molecular diffusivities of the species to be separated measured in these phases under the conditions of chromatographic separation. When the latter are not available experimentally, it is possible to estimate them by the method of Wilke and Chang.
the porous fractions filled with the organic gel or an organic liquid stationary phase in the wall, as well as the molecular diffusivities of the species to be separated measured in these gels, if this is the case under the conditions of chromatographic separation.
the geometry of the wall including details such as the position and the dimensions of the areas filled with the organic gel, the organic liquid and the mobile phase and optional dead areas or filled with fluids or substrates other than the mobile phases, the organic liquid and the organic gel, as well as the molecular diffusivities of the species to be separated measured in the latter under the conditions of chromatographic separation.
the partition coefficients of the species to be separated between the different phases in presence in the encountered range of concentrations during the chromatographic process.
the pressure drop applied to the packing and the composition of the eluting fluid as well as its viscosity under the conditions of chromatographic separation.

In a more approached way preliminary to a simulation, it is possible to approach the diffusional flow rates with the following equations.

The following numerical quantities may be defined:

$$G_{wall}=K*D_{eff}/ep$$

$$G_{mobile}=3.66*Do/(Dh)$$

with $K=C_{stat}/C_{mobile}$ and $Phic/Phip>G_{mobile}/G_{wall}$ is inferred therefrom, wherein K is the partition coefficient of the relevant species between the stationary phase considered as being defined by the whole volume of the wall, and the mobile phase, $C_{stat}$ is the concentration of the species to be separated in the stationary phase (mol/m$^3$), $C_{mobile}$ is the concentration of the species to be separated in the mobile phase (mol/m$^3$) at thermodynamic equilibrium with the latter, Deff (m$^2$/s) is the effective diffusivity or diffusion coefficient in the material of the wall, ep(m) is the average thickness of the wall separating two conduits, Do is the diffusion coefficient of the relevant species in the free mobile phase, and Dh is the average hydraulic diameter of the capillary conduit.

Also, as a preliminary to a simulation, this will advantageously amount to posing a condition on the ratio between the maximum number of theoretical plates of a NETMax separation and the actually observed number of theoretical plates at the efficiency optimum NET for a compound not retained on the actual material.

NETMax at the optimum efficiency may be taken to be equal to the formula given earlier in this text.

NETMax=1.6*L/(Dh+e*P)

Advantageously, NETMax is obtained by a computer simulation.

Advantageously, NET/NETMax is greater than 0.1, and even more advantageously greater than 0.5.

Advantageously, the size of the pores of the continuous medium is greater than twice the molecular diameter of the species to be separated.

Advantageously, the size of the pores of the continuous medium is greater than 10 times the molecular diameter of the species to be separated.

Advantageously, the size of the pores of the continuous medium is greater than twice and less than 1,000 times the molecular diameter of the species to be separated.

Advantageously, the size of the pores of the continuous medium is greater than twice and less than 30 times the molecular diameter of the species to be separated.

In a condensed phase, the steric hindrance to diffusion caused by the pores is calculated by the formula (Deen, 1987):

$C = K_p * K_r$

With $K_p = (1-\lambda)^2$

And $K_r = 1 - 2.104*\lambda + 2.089*\lambda^2 - 0.948*\lambda^3$ $$\lambda = \frac{R_h}{r_0}$$

$R_h$ is the molecular radius of the molecule of a species to be separated considered as a sphere and $r_0$ the radius of the pores (diameter of the pores do).

$K_p$ is a factor taking into account a deviation of the concentration at equilibrium between the pores and the infinite medium.

$K_r$ takes into account the steric hindrances of the molecules to be separated in the volume of the pores.

C is the reduction factor of diffusivity in a free medium to be applied in order to obtain the diffusivity in the pores.

It is thus seen that the group C becomes less than 0.1 for a ratio 2 of 0.5, corresponding to a pore size of less than twice the diameter of the molecule of the species to be separated. An order of magnitude is lost on the effective diffusivity, which becomes prohibitively low, and the efficiency of the separation becomes poor.

The following table calculates the ratio C for different molecules and different pore sizes.

| Molecule | rh (nm) | d₀(nm) | λ | Kp | Kr | C |
|---|---|---|---|---|---|---|
| organic | 0.15 | 0.3 | 1 | 0.00 | 0.04 | 0.00 |
| organic | 0.15 | 0.6 | 0.5 | 0.25 | 0.35 | 0.09 |
| organic | 0.15 | 1 | 0.3 | 0.49 | 0.53 | 0.26 |
| organic | 0.15 | 2 | 0.15 | 0.72 | 0.73 | 0.53 |
| organic | 0.15 | 4 | 0.075 | 0.86 | 0.85 | 0.73 |
| organic | 0.15 | 6 | 0.05 | 0.90 | 0.90 | 0.81 |
| organic | 0.15 | 10 | 0.03 | 0.94 | 0.94 | 0.88 |
| protein | 1.5 | 6 | 0.5 | 0.25 | 0.35 | 0.09 |
| protein | 1.5 | 10 | 0.3 | 0.49 | 0.53 | 0.26 |

-continued

| Molecule | rh (nm) | d₀(nm) | λ | Kp | Kr | C |
|---|---|---|---|---|---|---|
| protein | 1.5 | 30 | 0.1 | 0.81 | 0.81 | 0.66 |
| protein | 1.5 | 100 | 0.03 | 0.94 | 0.94 | 0.88 |
| macromolecule | 5 | 30 | 0.33 | 0.44 | 0.50 | 0.22 |
| macromolecule | 5 | 100 | 0.10 | 0.81 | 0.81 | 0.66 |
| macromolecule | 5 | 300 | 0.03 | 0.93 | 0.93 | 0.87 |

In a gas phase, the diffusion becomes hindered when the diffusive flow enters a Knudsen flow. This occurs when the mean free path of the molecules becomes of the order of or greater than the diameter of the pores.

Advantageously, the packing has a population of connected pores, for which the diameter is greater than the mean free path of the molecules to be separated under the conditions of the method.

The Knudsen diffusivity is written as:

$$D_{KA} = \frac{d_{Pore}}{3} * \sqrt{\frac{8*\kappa*N_{av}*TK}{\Pi*M_A}}$$

When the Knudsen diffusivity and the molecular diffusivity compete with each other, it is possible to write as:

$$\frac{1}{D_{Ae}} = \frac{1}{D_{KA}} + \frac{1-\alpha*y_A}{D_{AB}}$$

With $$\alpha = 1 + \frac{N_B}{N_A}$$

Generally, this formula is simplified by:

$$\frac{1}{D_{Ae}} = \frac{1}{D_{KA}} + \frac{1}{D_{AB}}$$

The coefficient C is inferred therefrom $$C = \frac{D_{Ae}}{D_{AB}} = \frac{D_{KA}}{D_{AB} + D_{KA}}$$

In these formulae it is noted that:
$D_{KA}$: Knudsen diffusivity, m²/s
$D_{AB}$: molecular diffusivity m²/s
$D_{Ae}$: diffusivity under intermediate conditions m²/s
TK: absolute temperature, Kelvin
$M_A$: molar mass of the component A, kg/mol
κ: Boltzmann constant, MKSA
$N_{av}$: Avogadro number
$d_{pore}$: diameter of the pores, m In particular, water, hexane or methanol, in a liquid phase or in a gas phase at the saturating vapor pressure at 25° C. may be considered as standard test species.

The term "effective diffusivity" designates the diffusivity experimentally seen in a real material considered as a macroscopic assembly. The actual material consists of the material extending between the conduits except for the latter, it comprises at least one porous organic gel or an organic liquid (not porous) and a possible structural material. The diffusivity in the actual material is related:

to an optional porous volume of the latter into which the mobile phase may penetrate and into the species to be separated may diffuse, and to the diffusivity in the organic gel itself.

The porosity of a cross-linked organic gel may stem from its swelling in an organic, mineral or aqueous solvent. This is for example the case of copolymers of styrene and of 2 to 8% of divinylbenzene.

It may also stem from a porosity of the gel in the non-solvated state. For example this is the case of copolymers of styrene and of 20 to 80% of divinylbenzene polymerized in the presence of a pore-forming solvent like an aliphatic alcohol including 8 to 12 carbon atoms in its molecule.

It may also stem from the porosity of a support on which a polymeric gel is deposited as a thin layer.

The effective diffusion is measured by imposing on either side a uniform thickness Eu and a representative material surface S of the actual material of different concentrations $C_{downstream}$ and $C_{upstream}$ of a molecule dissolved in the stationary phase, and by measuring the material flow c of this molecule through said thickness which results from this.

The diffusion coefficient $D_{eff}$ is inferred therefrom according to the formula:

$$D_{eff} = \Phi \cdot Eu / ((C_{upstream} - C_{downstream}) \cdot S)$$

The material exchange surface between a conduit and an adjacent conduit is advantageously greater than 2% of its periphery, more advantageously greater than 10% of its periphery, and even more advantageously greater than 20% of its periphery.

In practice, the conduits are advantageously bound through a continuum or a diffusive bridge in the condensed state.

In practice, the effective diffusivity of the species to be separated in the walls of the packing is advantageously greater than one thousandth of their diffusion coefficient in the free mobile phase, more advantageously greater than a hundredth of their diffusion coefficient in the free mobile phase, and even more advantageously greater than one tenth of their diffusion coefficient in the free mobile phase.

In order to measure the effective diffusivity, the so-called conductive cell under stationary conditions method is preferably used. An exhaustive description of this method will be found in [3]. In particular, the effective diffusivity will be measured after complete equilibration of the stationary phase contained in the cell and of the species on which the measurement is carried out. In the case of the affinity chromatography, this generally amounts to carrying out the measurement on a stationary phase saturated with adsorbate.

In practice, it is ensured that the effective diffusivity of the solutes through the walls of the conduits is advantageously maintained above $1e^{-12}$ m$^2$/s in liquid phase chromatography, above $1e^{-10}$ m$^2$/s in supercritical phase chromatography, and above $1e^{-10}$ m$^2$/s in gas chromatography.

The diffusion of the species of the mobile phase into the walls of the packing may be achieved in two ways at least, i.e. by diffusion into the bulk of the gel or organic liquid or by diffusion outside the organic gel, in its porosity.

Such diffusivity may be obtained by a combination of a porous volume, of a cross-linking level of the organic gel, of the elution solvent and of the operating temperature according to the knowledge of one skilled in the art and the available data.

The organic gel permeable to molecular diffusion used in the present invention may also be defined by the fact that its permittivity towards species to be separated is greater than 5,000 Barrer.

The Barrer is a permittivity unit defined in (cm$^3$ of diffusing solute, as a perfect gas under standard conditions .cm)/(cm$^2$ s cm Hg):

1 Barrer=$10^{-10}$(cm$^3$ O$_2$ cm)/(cm$^2$ s cm Hg)

The table below indicates the permittivities of common organic polymers towards oxygen and water.

| Polymer | Trade name | O$_2$ permittivity, Barrer | H$_2$O permittivity, Barrer |
| --- | --- | --- | --- |
| Poly(isoprene) | Natural rubber | 23.3 | 2290 |
| PolyChloroprene | Neoprene G | 4.0 | 910 |
| Poly(vinyl chloride) | PVC (non-plasticized) | 0.045 | 275 |
| Poly(tetrafluoroethylene) | Teflon | 4.2 | 4.8 |
| Low density poly(ethylene) | LDPE | 2.2 | 68 |
| Poly(propylene) | PP | 1.2 | 35 |
| Poly(methyl methacrylate) | Plexiglas | 1.2 | 3200 |
| Poly(carbonate) | Lexan | 1.4 | 1400 |
| Unsaturated polyester | Polyester | | 750 |
| Cellulose | Cellulose | | 18900 |

Indicatively, the diffusivity of water is only significant for materials having a permittivity above 5,000 Barrer (polyisoprene, Plexiglas) and preferably greater than 25,000 Barrer (cellulose). On the other hand, a material such as the unsaturated polyester has a permittivity comparable with that of polyethylene and of polycarbonate, which are materials recognized as leak-proof and non-porous since they are used for making impermeable containers or walls.

Advantageously, the permittivity of the organic gel towards species to be separated is greater than $10^5$ Barrer, and still even more preferred greater than $10^6$ Barrer.

In order to measure the permittivity of the organic gel, the assembly described in reference between [1] will be used.

The packing may comprise as an organic gel permeable to molecular diffusion, a gel mainly consisting of organic chemical species and therefore mainly consisting of carbon and of species usually bound to carbon within the scope of organic chemistry. In particular, it will mainly consist of an association of a backbone of carbon atoms and of hydrogen, oxygen, nitrogen, phosphorus, sulfur, chlorine, fluorine, bromine, iodine atoms. Mention will be made of hydrocarbon, halogenocarbon, hydroxycarbon, oxycarbon, sulfocarbon, phosphorocarbon, nitrocarbon, etc. species of natural or artificial origin.

Without departing from the scope of the invention, this gel may consist of organometallic species. From among the atoms which may be used as such in the present invention as taking part in the organic gel molecules, mention may mainly be made of silicon, tin, lead, boron, aluminum, gallium, indium, zinc, beryllium, magnesium, titanium, zirconium, arsenic, antimony, selenium, etc.

In particular, the organic gel may comprise in its bulk products which may be obtained by co-condensation of orthosilicates and organosilanes. These silanes may include one, two or three Si—C or Si—R bonds. R may be any carbon radical, such as a propyl, butyl, octyl, octadecyl radical, a primary, secondary, tertiary or quaternary amine, an alcohol, an organic acid, a reactive group, etc. . . . In a non-limiting way, one or several mono-, bi- or tri-functional silanes may take part in the structure. In document [4]

examples of such materials will be found and which may be used for carrying out the invention.

Said gel has, under the conditions of its use, sufficient permittivity for allowing molecules or macromolecules to diffuse in it or in its porous volume and of interacting selectively with it so as to achieve a chromatographic process in less than a few hours, advantageously less than a few tens of minutes and advantageously less than a few minutes. By "conditions of its use", is essentially meant temperature conditions and the use of gas, liquid or supercritical mobile phases giving the possibility of benefiting from its permittivity by allowing species (molecules or macromolecules) present in the mobile phase of diffusing in the bulk or the porous volume of said gel and of interacting selectively with it.

Within the context of the present invention, an organic gel is an essentially macroscopic notion. Said gel is an integral material which may exist and be handled independently of its optional support.

This distinguishes it fundamentally from layers of a molecular thickness resulting from a grafting of silanes on a surface for example which do not exist independently of their support.

According to a preferred embodiment of the invention, this organic gel consists of an organic polymer.

Advantageously, the molecular weight of this polymer is greater than 1,000 g/mol.

According to an embodiment, the organic gel is a copolymer of styrene and of divinylbenzene.

The copolymers of styrene and of divinylbenzene have high diffusivity and permeability towards molecules dissolved in a solvent. In order to increase this diffusivity, the styrene level is reduced. This reduction has the effect of making the polymer mechanically more fragile. However, because of the low pressure drop of a multicapillary packing, the mechanical forces on the polymer are less significant than for a packing without any conduits, which gives the possibility of reducing the styrene level without degrading the mechanical strength of the packing relatively to known packings without any capillary conduits.

According to a first embodiment of the invention, the weight level of divinylbenzene in the styrene is less than 20%, advantageously less than 8%, and even more advantageously less than 2%. The porosity of such gels is developed by swelling with an elution solvent. They are used in particular in steric exclusion chromatography.

According to a second embodiment of the invention, the weight level of divinylbenzene in the styrene is greater than 20%, advantageously greater than 40%, and the polymerization is conducted in the presence of a pore-forming agent like a solvent of the monomers in which the polymer is insoluble. The porosity of such gels is inherent to their structure in the dry condition.

Mention may also be made in a non-limiting way as able to be used for carrying out the invention and as constitutive materials of the packing, gels of polyvinyl alcohol, of polymethyl methacrylate, of polyhydroxymethyl methacrylate, of polyacrylamide, of hydroxyethyl methacrylate copolymerized with glycidyl dimethacrylate (GMA-EDMA), etc.

The polyacrylamides advantageously consist of copolymers of acrylamide and of N, N'-methylene-bis-acrylamide.

Mention may also be made of cellulose (a polyholoside) and its derivatives, notably carboxymethyl celluloses and diethylaminoethyl celluloses for ion exchange chromatography.

It is also possible to use polyholoside organic gels known in the state of the art using organic macromolecules like cross-linked dextrans, for example with N,N-methylene-diacrylamides or epichlorhydrins. These gels are in particular known under the trade names Sephacryl™ and Sephadex™, products from GE Healthcare Corporation.

It is also possible to use other polyholoside organic gels using organic macromolecules like cross-linked agaroses, for example with epichlorhydrins. These gels are in particular known under the trade names of Sepharose™ and Superdex™, Superose™, products from the GE Healthcare Corporation.

It is also possible to use other organic gels using artificial macromolecules like vinyl polymers containing many hydroxyl groups. These gels are in particular known under the trade name of ToyoPearl™, products from the Tosoh group.

In particular, these organic gels may be produced starting with mixtures of monofunctional monomers and multifunctional monomers. The multifunctional monomers cross-link the obtained polymer.

These organic gels may be prepared starting with mono-, di- and multi-functional monomers known in the state of the art. The latter may be monomers containing epoxy, vinyl or hydroxyl siloxane radicals. These may be styrene and its derivatives containing hydroxyl, halogen, amino, sulfonic, carboxylic, $NO_2$ groups, C4, C8, C12, C18 alkyl chains etc. . . . . These monomers may be acrylates, methacrylates, acrylamides, methacrylamides, vinylpyrollidones, vinylacetates, acrylic acid, methacrylic acid, vinyl sulfonic acids. The siloxanes may include a hydroxyl group, vinyl, alkyl groups, etc . . . .

In particular, these monomers may be chloromethyl styrene, 4-acetoxystyrene, methyl, ethyl, propyl, butyl, hexyl, lauryl, triphenylmethyl, pyridyl-2-diphenylmethyl, methyl, ethyl, propyl, butyl, hexyl, lauryl, glycidyl methacrylate, AMPS, 2-vinyl-4,4-dimethylazlactone, methyl 2-3-epoxypropyl methacrylate, etc. . . .

These functional groups may be provided before or after the polymerization.

The monofunctional monomer level may vary between 2% and 98% by weight of the total monomers.

Advantageously, it is comprised between 2% and 40% by weight of the total monomers.

The bi- or multi-functional monomers may be monomers based on benzene, naphthalene, pyridine, alkyl ethylene, glycol, etc. including two or several functional vinyl or epoxy groups. Examples of these components are divinyl benzenes, divinyl naphthalenes, alkoyl diacrylates and dimethacrylates, diacrylamides, and dimethylacrylamides, divinyl pyridines, dimethacrylates or diacrylates of ethylene glycol, polyethylene glycol, trimethylolpropane di- or trimethacrylate, 1,3 butanedioldiacrylate, pentaerythritol di-, tri- or tetra-methacrylates or acrylates, or mixture thereof. Di-, tri- or tetra-hydroxylated siloxanes often generated starting with alkoxysilanes may be used.

The bi- or multi-functional monomer level may vary between 100% and 2% by weight of total monomers.

Advantageously, said level is comprised between 98% and 60% by weight of the total monomers.

The initiators used for polymerization comprise all those comprised in the state of the art, such as azo compounds and peroxides. Typical examples are azobisisobutyronitrile, benzoyl peroxide, the typical amount of initiator generally varies from 0.4 to 2% by weight based on the weight of the monomers.

In the case of siloxanes, acid hydrolysis is preferred.

Advantageously, these mixtures are polymerized in the presence of a pore-forming agent removed subsequently like an organic solvent or a non-reactive polymer. These pore-forming agents were mentioned earlier. Mention will in particular be made of dodecanol-1 and cyclohexanol-1.

The amount of pore-forming agent may vary between 10 and 90% and preferentially between 20 and 60% by volume of the final mixture comprising the monomers.

Polymerization under X-rays or gamma rays may be used for the homogeneous manufacturing of parts with a large size.

Advantageously, these organic gels may be treated at their surface so as to functionalize them by grafting like for example with silanes. It is possible to provide them with sulfonated groups (sulfonation), quaternary ammoniums, octadecyl, octyl, butyl, phenyl, amine, diethyl amino, ethyl, sulfopropyl, carboxymethyl radicals, hydrophilic polymers, alpha, beta, gamma cyclodextrins, either methylated or not, L-amino-acids or D-amino-acids, proteins etc. . . .

On gels including aromatic rings, it is possible to use functionalization reactions such as chloromethylation, amination, nitration, sulfonation, Friedel Crafts alkylation and acylation, etc. . . .

Advantageously, the organic gels which may be used for ion exchange chromatography or complexation chromatography comprise aminodiacetate, phosphonate, amidoxime, amidophosphonate, thiol, sulfonate, primary, secondary, or tertiary, or quaternary amine, carboxylic and pyridyls, etc. . . . radicals.

Advantageously, the organic gels which may be used for chromatography of electron donors, acceptor complexes comprise nitro- or chloro-aromatic radicals, or phenoxy, pyrene, quinazoline-2 radicals, like dinitro-2-4-aminopropyl, trinitro-2,4,6-anilinopropyl, tetranitro-2,4,7-fluorenoiminopropyl, tetrachlorophtalimidopropyl, nitro-3-naphthalimido-1,8-propyl, naphthalene tetracarboxy-1,4,5,8-diimidopropyl, pyromellidiimidopropyl, pentafluorobenzamidopropyl, caffein, phenoxy, quinazoline-2, quinolinol,-8,2,2,2-trifluoro-1(10-methyl-9-anthryl)ethanol, pyrenepropyl etc. . . .

Advantageously, the organic gels which may be used for ligand exchange chromatography comprises the bis-dithiocarbamate, cyclam, oxine, dialkyldithiocarbamate radicals, etc.

Advantageously, the organic gels which may be used for the separation of chiral molecules comprise chiral selectors generally selected from among groups of the Pirkle type, cyclodextrins and crown-ethers, natural and synthetic polymers, proteins.

From among the groups of the Pirkle type mention may be made inter alia of:
R or S (dinitro-3,5)benzoyl)phenylglycine
R or S N-(dinitro-3,5-benzoyl)tyrosine n-butylamide
S—N-(dinitro-3,5 benzoyl)tyrosine(naphthyl-1)-1ethylamide
R or S-(dinitro-3,5 benzoyl)phenylglycine
S-(dinitro-3,5-benzoyl)leucine
S-(dinitro-3,5-benzoyl)phenylalanine
R or S naphthylamine
R α-methylbenzylurea
S α-(naphthyl-1)ethylamine.
Mention will also be made of the derivatives of the following products:
R-phenylglycine and S-(chloro-4-phenyl)-4-isovaleric acid
R-phenylglycine and 1-R, 3-R,-chrysanthemic acid
Dinitro-3,5-benzoyl and R or S naphthyl-1 glycine
Tert-butylamine and S valine
Dinitro-3,5-aniline and S valine
Dinitro-3,5-aniline and S-tert-leucine
S-(α-naphthyl)-1 ethylamine and S-valine
R-(α-naphthyl)-1 ethylamine and S-valine
R-phenylglycine and R-(α-naphthyl)-1-ethylamine
R-phenylglycine and S-(αnaphthyl)-1-ethylamine
S-proline and R-(α-naphthyl)-1-ethylamine
S-proline and S-(α-naphthyl)-1-ethylamine
S-tert-leucine and R-(α-naphthyl)-1-ethylamine
S-tert-leucine and S-(α-naphthyl)-1-ethylamine
Tartaric acid and dinitrobenzylphenyl-ethylamine
From among the ligand exchangers mention will inter alia be made of:
Proline, hydroxyproline, valine, etc. . . .
Carboxymethylamino-2-diphenyl-1,2-ethanol
From among cyclodextrins and crown-ethers, mention will inter alia be made of:
crown-ethers and derivatives
α, β, γcyclodextrins
acetylated α, β, γcyclodextrins
derivatives of βcyclodextrins (S-hydroxypropyl)
derivatives of βcyclodextrins (racemic hydroxypropyl)
derivatives of βcyclodextrins (S or R (α-naphthyl)-1-ethyl-carbamate)
derivatives of βcyclodextrins (racemic(α-naphthyl)-1-ethyl-carbamate)
derivatives of βcyclodextrins (dimethyl-3,5-phenylcarbamate)
derivatives of βcyclodextrins (para toluyl)
From among the natural polymers, mention will inter alia be made of:
triacetylated microcrystalline cellulose
cellulose triacetate
Cellulose tribenzoate
Cellulose triphenylcarbamate
Cellulose tri-(dimethyl-3,5-phenyl)carbamate
Cellulose tri-4-chlorophenylcarbamate
Cellulose tri-4-methylphenylcarbamate
Cellulose tri-4-methylbenzoate
Cellulose tricinnamate
Amylose tri-(phenylethylamine)carbamate
Amylose tri-(dimethyl-3,5-phenyl)carbamate
From among synthetic polymers, mention will inter alia be made of:
Poly(N-acryloyl-1-phenylalanine ethylester)
Poly(triphenyl methylmethacrylate)
Poly(pyridyl-2-diphenyl-methylmethacrylate)
From among proteins, mention will be made inter alia of:
Bovine serum albumin (BSA)
α-glycoproteic acid
Human serum albumin
Ovomucoid.

A list of these groups will be found in reference [2] p. 574 and 575.

These organic gels may be used for carrying out affinity chromatography. Affinity chromatography separates biochemical molecules based on highly specific interactions such as antigen-antibody, enzyme-substrate, or receptor-ligand.

Contacting is achieved by circulation of the mobile phase through conduits of the packing, allowing binding of the target molecules on the organic gel.

The bound compounds are eluted by a change of pH, of pI, of salt concentration, of charge or of ionic force in general. This proceeds with a step (slot) or with an elution gradient for recovering the molecules of interest.

Different forms of affinity chromatography are usually considered: by immunoaffinity, by immobilized metal ions, by recombinant proteins, by lectins (see in particular the article of Wikipedia on this technology).

In particular, by immunoaffinity, proteins on a substrate such as agarose are coupled covalently, and they are used for purifying their antibodies.

In particular, with immobilized metal ions, metal ions such as Cu, Ni, Co are coupled with a substrate such as agarose for purifying proteins or peptides containing histidine. Metal ions such as Fe, Zn, Ga are coupled with a substrate such as agarose for purifying phosphorylated proteins or peptides. The elution is accomplished by changing pH or by solutions of competitors such as imidazole.

In particular, by recombinant proteins, the proteins are marked, so as to be able to select them, with markers such as glutathione S transferase (GST, hexahistidine (Hs), Maltose (MSP). Histidine has high affinity for Ni or Co by coordination or covalency. The elution is accomplished with solutions containing an excess of solute capable of binding to the immobilizing metal, such as imidazole, or for example an excess of glutathione.

In particular, by affinity for lectins, the marking of the molecules gives them the possibility of selectively binding to carbohydrates. Ligands such as conconovaline A bind to the glucose chains of glycoproteins and give the possibility of isolating them.

Packings containing organic gels according to the invention lend themselves to separations by affinity.

As these gels are characterized by a high volume unit cost, it is advantageous to reduce the immobilized volume thereof for a given production.

Advantageously, the packings for affinity chromatography have a low volume of conduits towards the total volume of the packing, preferably less than 40%, more preferentially less than 20% and even more preferentially less than 10% of the total volume of the packing.

Advantageously, the distance between neighboring conduits is less than 0.5 mm, preferably less than 0.25 mm, and still preferably less than 0.1 mm, in order to ensure sufficient rapidity of the diffusional processes. The propagation front of the retained molecule is thus more steep and small lengths of column may be used, thereby reducing further the volume of the packing.

Advantageously, the organic gel represents a high volume of the volume of the relevant excluding the volume of the conduits, advantageously greater than 40%, more preferentially greater than 60% thereof.

Advantageously, these packings are used for affinity chromatography in radial or axial continuous annular chromatography devices. The amount of stationary phase required for a given production is therefore reduced to a minimum by reducing without any costly devices by means of instruments operating under low pressure, the amount of immobilized stationary phase by short cycle times.

According to an embodiment of the invention, a porous polymeric organic gel may comprise in its porosity a third party solid body. Advantageously in this case, the packing including the polymeric organic gel and intended to be used as a support for a third party solid body will have connected pores with a large size, greater than 50 nm, preferably greater than 200 nm, and even more preferentially greater than 500 nm.

Advantageously, the packing including the polymeric organic gel and intended to be used as a support for a third party solid body has a specific surface area of less than 20 $m^2/g$.

Advantageously this third party solid body is a stationary phase for chromatography.

Advantageously this third party solid body may be any of the stationary phases listed earlier.

Advantageously this third party solid body may be a mineral or organometallic stationary phase. Among the latter, one may designate in a non-limiting way oxides of silicon, alumina, titanium, zirconium.

Advantageously, this third party solid body may be silica with a high specific surface area for chromatography.

In a more general way, the invention relates, in the field of liquid phase chromatography to:
 liquid-liquid partition chromatography,
 partition chromatography on grafted stationary phases and non-ionic polymers,
 ion exchange chromatography,
 ionic chromatography,
 ion pair chromatography,
 ligand exchange chromatography,
 chromatography with electron donor-acceptor complexes,
 steric exclusion chromatography,
 all the alternatives of affinity chromatography.

Advantageously, the injection of the mobile phase is accomplished through a filter for which the cut-off diameter is less than the diameter of the conduits, and preferably ten times less than the diameter of the conduits.

Figure 1:
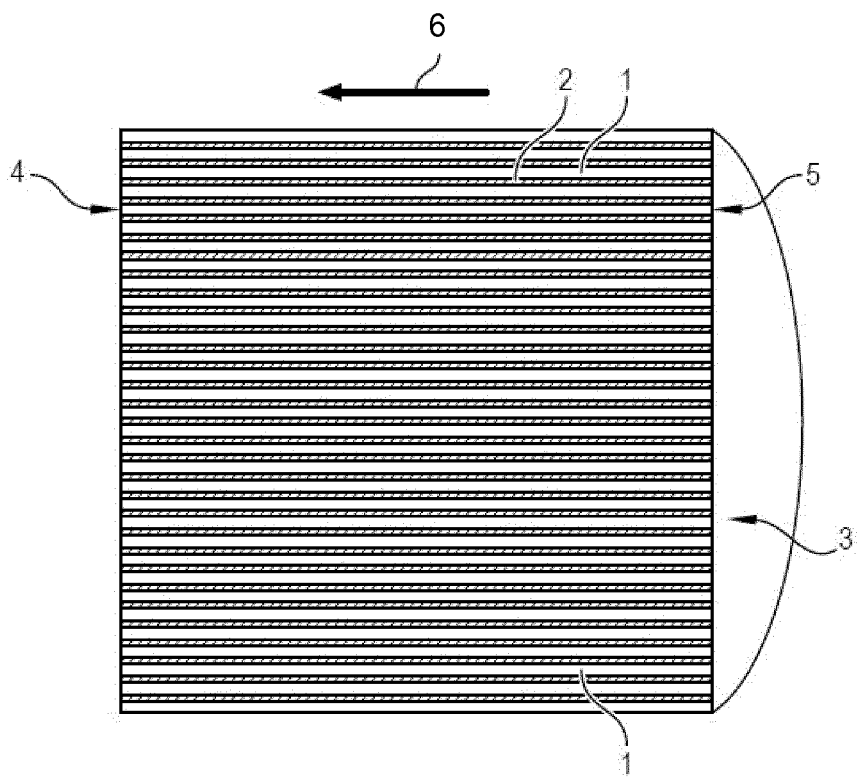

FIG. 1 is a sectional view of a multicapillary packing 3 according to an embodiment of the invention in a plane parallel to the longitudinal axis of said packing.

In this embodiment, the packing is a porous monolith formed with an organic gel 2 crossed by capillary conduits 1 wherein a fluid or supercritical mobile phase crossing the packing 3 may freely circulate. By "monolith" is meant a porous material in one piece, comprising a continuous backbone, which may be made in one or several materials.

In the example illustrated in FIG. 1, the capillary conduits are straight, parallel and spaced out regularly. The different conduits have morphologies and diameters as identical as possible. Each conduit crosses the packing right through, i.e. it advantageously has its ends open on each side 4 and 5 of the packing, allowing circulation of the fluid from the inlet side 4 to the outlet side 5.

Such a packing may therefore be used in a chromatographic column.

Figure 2:
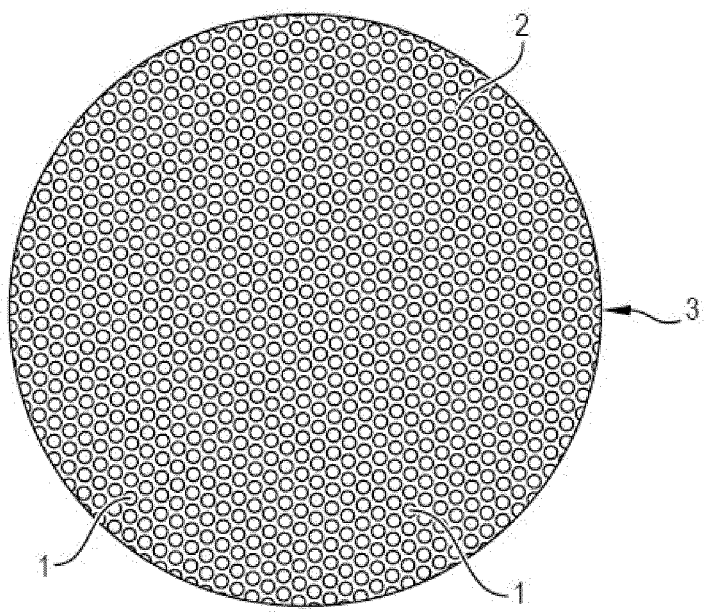

FIG. 2 is a top view of the face 5 of the packing of FIG. 1 seen along the direction 6. The openings of the individual capillary conduits 1 are distinguished in the bulk 2 of organic gel.

According to an alternative embodiment, in so far that the organic gel generally has a limited mechanical strength, the monolith comprises a porous backbone made in a dimensionally stable material and more resistant than the organic gel, and the pores of said backbone are covered with at least partly organic gel.

Figure 3:
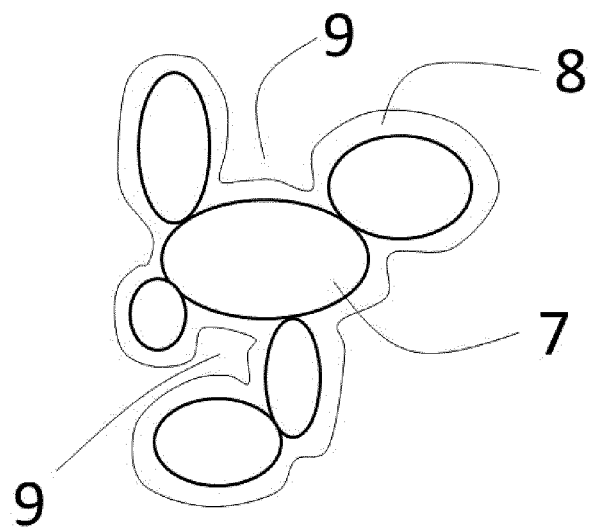

FIG. 3 thus illustrates a backbone 7 in a dimensionally stable material, for example obtained by sintering of a molded or extruded powder according to the shape of the packing, or obtained by a sol-gel or load-binder method. The organic gel 8 is deposited as a thin layer on the surface of the backbone 7, and notably on the surface of the pores. The packing has a continuous network of macropores 9 allowing molecules to rapidly diffuse in the whole thickness of the packing and between adjacent conduits.

Figure 4:
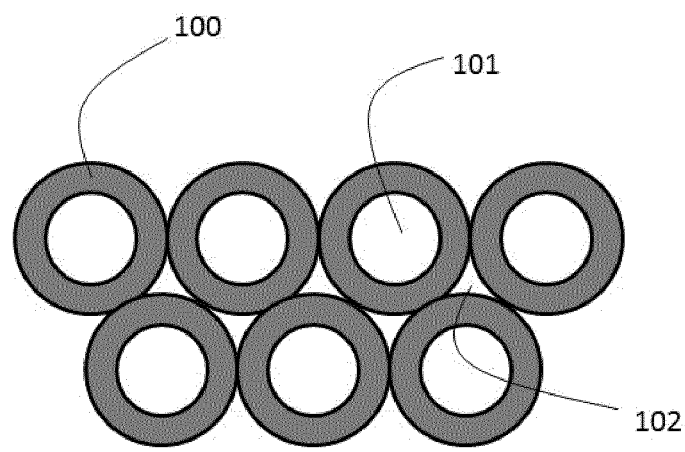

FIG. 4 illustrates another embodiment of the packing.

According to this embodiment, hollow fibers are juxtaposed along an optimum stack as compact as possible. These hollow fibers consist of an empty core 101 in which flows the mobile phase and of a porous envelope 100 retaining the organic gel or consisting of the organic gel. The space between the fibers 102 is either filled with the mobile phase or with the gel or organic liquid.

Various methods for manufacturing a packing as described above will now be described.

According to a first embodiment of the invention, it is possible to coat with an organic gel a multicapillary monolith obtained by extrusion and sintering. This monolith should be porous. It therefore has to be prepared and sintered under conditions allowing retention of a significant porosity. However, the diameter of the conduits obtained by such an extrusion method, which is of the order of one millimeter, is generally too large as regards a chromatographic application.

According to an embodiment, in order to form a monolithic packing, a method is applied comprising steps:
  providing a bundle of threads called "precursors of the conduits", i.e. threads which are intended to be removed subsequently for leaving their imprint as conduits. Advantageously, the outer diameter of the threads is equal to the inner diameter of the conduits,
  forming a porous matrix around threads or conduits,
  removing the threads so as to form said capillary conduits.

According to an embodiment, the matrix formed around the threads or conduits consist of a polymeric organic gel.

Alternatively, the matrix formed around the threads or conduits is loaded with an organic gel.

Optionally, the precursor threads of the conduits comprise an ablative layer of a coating material removed during a first step for the removal treatment of the threads. This ablative material may in particular be a wax or a paraffin.

Commercial fibers of nylon, polypropylene, cellulose acetate, polyester, aramide, carbon fiber, metal, etc. may be used as precursor threads of these conduits with such constraints. Fibers are preferably used not containing any toxic metal salts in order to not pollute the final structure of the material.

According to a particular embodiment of the invention, the precursor threads of the conduits, optionally coated with the ablative layer, are coated with a spacer prior to the formation of the bundle so as to ensure a minimum thickness of material between two adjacent conduits.

According to an embodiment, threads consisting of a hydrolyzable polymer are assembled as a bundle, the bundle being immersed in a precursor solution of a porous organic gel, a solution for which gelling is caused around the threads, and the threads are removed by hydrolysis into soluble species with a low molecular weight by immersion of the packing in an acid or basic solution. Indeed, the highly inert nature of an organic gel gives the possibility of putting it into contact with strongly acid and strongly basic aqueous solutions. By "precursor solution of an organic gel", is meant a liquid with a composition such that, by its development under the conditions of the manufacturing method, it leads to an organic gel.

From among hydrolyzable polymers, mention may be made inter alia of polyesters derived from glycolic acid, from lactic acid, from cellulose, and in particular cellulose acetate, polyglycolic acid or its copolymers with lactic acid, with ε-caprolactone or with trimethylene carbonate, as well as polydioxanone. A polymer is preferably selected for which the hydrolysis is fast at a temperature from 80 to 100° C. in an acid or preferably basic medium.

According to another embodiment, a multicapillary monolith is made of silica gel. The porous fraction external to the conduits of the monolith receives the organic gel. The silica backbone is removed by dissolution in an aqueous solution with a pH greater than 11.0. The silica gel in this case plays the role of a pore-forming agent.

According to an embodiment of the invention, the threads consist of a metal or of an alloy of metals with a low melting point and are removed by melting and flowing out of the material.

Advantageously, a metal alloy is selected for which the melting temperature is less than the degradation temperature of the material making up the organic gel. Preferably, metals are selected for which the melting point is less than 220° C., preferably less than 150° C., and even more preferentially less than 100° C.

A significant use of these organic packings consists of producing separations on molecules and liquids intended for human or animal consumption. In particular this is drinkable water, drugs, food adjuvants, etc. . . .

In such a scenario, all the elements and components of the packing have to be compatible with strict sanitary constraints. In particular, it is important to avoid any pollution of the packing by toxic residues of the manufacturing process, and to avoid as far as possible the use of manufacturing intermediates which are toxic. The materials or constituents of the precursor metal threads of the conduits belong to these intermediates.

Indeed, residues of these metals may subsist in the packing and pollute the species which will be treated therein, or be distributed in nature after its destruction.

From among metals with a low melting point appear essentially lead, tin, bismuth, gallium, mercury, silver, cadmium and indium. As lead, cadmium and mercury are noxious heavy metals and harmful to human and animal health and to the environment, alloys are preferably selected not containing these elements and based on tin, bismuth, indium, gallium, silver or any association thereof with each other or with other less meltable metals.

In particular, this may be a mixture of bismuth and tin. In particular, there exists a eutectic mixture of these metals including 58% by weight of bismuth, 42% by weight of tin, and melting at 138° C.

Alternatively, these may be metal alloys based on indium. From among these indium alloys, an alloy with 52% indium and with 48% tin by weight, melting at 118° C. will preferably be used. It is also possible to use a 32.5% bismuth, 51% indium and 16.5% tin alloy by weight, melting at 60° C.

The matrix may be created by a load-binder method. Advantageously in this case, it may be created starting from a mixture containing a third party solid body like a load with small grain size and a binder like a sol, suspended in a liquid phase. This sol may be any organic or mineral sol, a silica, alumina, titanium, zirconium, natural or artificial latex sol, a sol of diverse polymers, colloids. For example will be noted
  the sols of natural latex,
  polystyrene lattices, and their functionalized derivatives (amino, carboxy, etc. . . . )
  lattices of copolymers of styrene with butadiene, acrylic acid, and their functionalized derivatives,
  sols of nitrile rubbers, etc. . . .
  polymethylmethacrylate sols
  This may also be a sol created in situ by a sol-gel process.
  The binder may also be a colloid like albumin, dextran, gelatin, hydroxyethylated starches, etc. . . .

Advantageously, the binder will not penetrate into the pores of the load. This may be obtained for example by selecting a binder divided into particles with sizes greater than those of the pores.

In particular, the multicapillary packing support of the organic gel may be generated a sol-gel process.

Without departing from the scope of the invention, this sol-gel process may also be based on an aluminosilicate like a clay for example.

Without departing from the scope of the invention, this sol-gel process may also be based on a zirconium oxide, a titanium oxide, a rare earth oxide like yttrium, cerium or lanthanum oxide, a boron oxide, an iron oxide, a magnesium, calcium, strontium or barium oxide, a germanium oxide, a phosphorus oxide, a lithium oxide, a potassium or sodium oxide, a niobium or copper oxide. These compounds may be the basis of the gel or may be combined together so as to generate a multi-component gel.

Advantageously, as a basis of the gel, it is possible to use gels of zirconium oxide or titanium oxide.

Advantageously, the sol-gel process leading to these mono- or multi-component gels will be based on the hydrolysis of organometallic compounds like alcoholates of the relevant metals, either alone or as a mixture with other organometals and optionally with metal salts such as nitrates or chlorides.

Another method for producing the packing according to the invention comprises the use of bundles of hollow fibers with porous walls impregnated with an organic gel by soaking and then drained so as to free the lumen of the fibers. It is thus possible to manufacture packings of large dimensions.

Such a manufacturing method comprises the steps of:
providing of a compact bundle of hollow fibers,
including in the porous wall hollow fibers of an organic gel or of its precursor polymerized in situ, so as to leave the lumen open and free of the hollow fibers,
creating porous or liquid material diffusive bridges between the hollow fibers.

By diffusive bridges, is meant a continuum of material permeable to molecular diffusion extending between the fibers.

The compactness of the stack of hollow fibers gives the possibility of reducing the molecular diffusion distances between the latter.

Material bonds between the hollow fibers advantageously make efficient diffusive bridges between the conduits.

The hollow fibers are advantageously secured to each other so as to reinforce their mechanical cohesion and to handle them collectively. In particular, they may be woven in a composite fabric or stuck together contiguously as a sheet.

In particular, they may be stuck together continuously in order to form a monolith.

The binder may be the actual organic gel.

According to an embodiment, it is possible to immerse the volume outside the fibers at their periphery in an organic liquid.

According to an embodiment, it is possible to use as a binder fibers together, a resin other than the organic gel, a porous binding resin.

It is possible to combine this last method with a reinforcement by a fabric of structural fibers.

According to another method for producing the packing according to the invention, a molding of the organic gel is carried out in a structure defining conduits.

Advantageously, this molding is carried out so as to obtain an organic gel film having a spacer as raised/recessed portions. The walls of the conduits may make up this spacer. The molding may be produced by embossing, extrusion, calendaring of a pre-existing film. This method may be carried out alone or on a reinforcement film or fabric.

The method may comprise the polymerization of the organic gel in situ in the mold having the preform of the spacers, and then removal from the mold.

Alternatively, the method comprises the molding of the molten organic gel or of its molten precursor in the mold and its solidification, and then removal from the mold.

The film is then stacked or wound so as to obtain the final packing.

The spacers make the free passage for the fluid through the structure.

When a porous polymeric organic gel contains a third party solid body, it is possible to create said third party body by deposition by soaking of the multicapillary packing in a formulation containing the third party body in suspension or a precursor of the third party body, or both simultaneously followed by draining and then drying of the gel.

In particular, the third party solid body may be created with a load-binder method. Advantageously in this case, it may be created starting from a mixture containing a third party solid body as a load with a small grain size consisting of a stationary phase for size chromatography of particles, less than the size of the pores of the polymeric organic gel and a binder like a sol, suspended in a liquid phase for impregnation of the porosity. This sol may be an organic or mineral sol, a silica sol, natural or artificial latex, a sol of diverse polymers, etc. . . . . This may also be a sol or a gel created in situ by a sol-gel process.

In particular, the third party solid body may be created on the surface of the polymeric gel by impregnating it with a colloidal solution optionally followed by its gel, and its drying. In particular it will be noted as particularly suitable silica sols with a high specific surface area.

In particular, the third party solid body may be created at the surface of the polymeric gel with a sol-gel process.

Any sol-gel process may be used as described earlier in this memorandum. In particular, this may be a bimodal silica obtained by a sol-gel process.

Advantageously, this third party solid body is silica for chromatography with high specific surface area bound by a silica sol.

Figure 5:
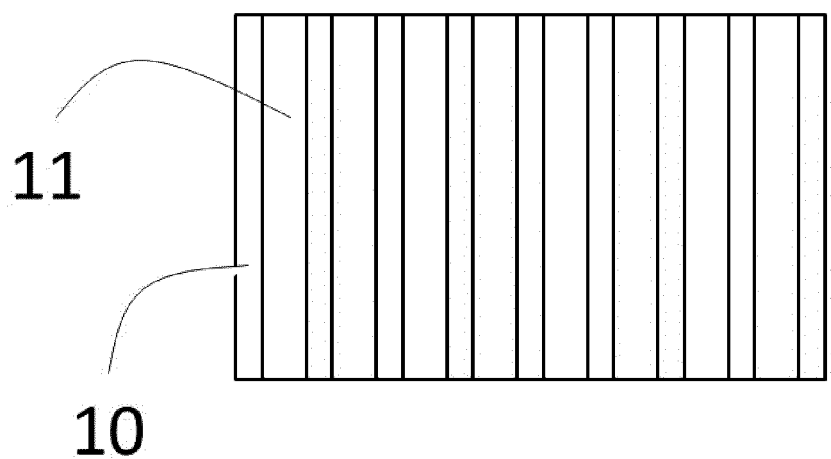
Figure 6:
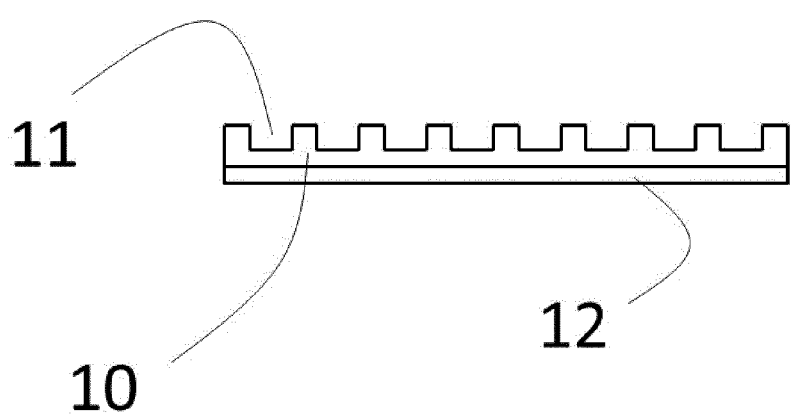

FIGS. 5 and 6 illustrate as seen from the top and as seen sectionally, respectively an organic gel 10 covered by conduits 11. This organic gel is as a sheet obtained by molding on a preform. It may be added onto an underlying fabric 12 ensuring better mechanical strength. The organic gel may contain a reinforcing load. The sheets may be wound or stacked in order to produce any desired shape.

Advantageously, the organic gel or the third party body which it supports is functionalized after creating the conduits.

By functionalization, is meant the provision of particular chemical groups giving reactivity or selectivity to the raw packing. In particular this is the providing of ion exchanger reactive groups, groups for treatment by silanes, polyholoside grafting groups, proteins and chiral molecule grafting, etc.

The packing typically has a section greater than 20 cm$^2$, and preferably greater than 100 cm$^2$.

The packing may have the shape of a disc or further of a column having two planar, encapsulated sections in a contiguous envelope used as a mechanical protection.

The seal of the junction between the packing and the envelope may be ensured by an adhesive, a polymer or a plastic film, in particular a thermoretractable film.

Advantageously, the packing may be directly created in said envelope.

A chromatographic process is generally characterized by the efficiency of the packing expressed in a number of theoretical plates.

Advantageously, the packing has an efficiency of more than 1,000 theoretical plates per packing meter, preferably more than 10,000 theoretical plates per meter of packing and still more preferably more than 100,000 theoretical plates per meter of packing.

Figure 7:
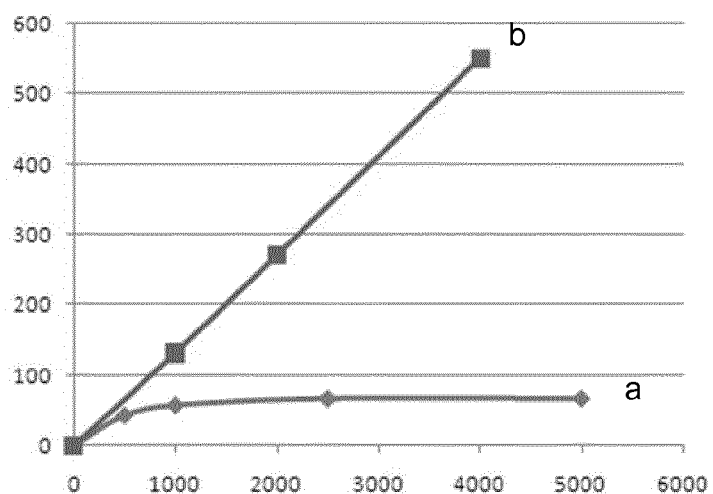

FIG. 7 compares the efficiencies of a multicapillary packing towards a chromatographic separation when the walls separating the capillary conduits are porous or non-porous, obtained by computer simulation.

The axis of the abscissas represents the length of the packing expressed in micrometers.

The axis of the ordinates represents the efficiency of the packing expressed as a number of theoretical plates (NPT).

The diameters of the conduits are distributed according to a Gauss law.

The curve (a) illustrates a packing consisting of conduits with a randomly variable diameter according to a Gaussian statistical law around an average of 10 μm with a standard deviation of 0.5 μm, for non-porous walls.

The curve (a) shows the efficiency of such a packing for which the walls are non-porous and for which the capillaries therefore behave independently of each other. This efficiency begins by increasing and then levels out so as to tend towards a limit independent of the length of the packing. This phenomenon is due to the fact that the diameters of the capillaries are not uniform but distributed according to a random Gaussian law.

The curve (b) illustrates the same bundle with porous walls having 55% of porous volume, a wall thickness of 2 μm and a pore size ten times greater than the molecular diameter of the species to be separated.

The curve (b) therefore exhibits the efficiency of a packing of the same dimensions as the previous one but for which the walls of the conduits are porous and wherein the adjacent capillary conduits communicate by molecular diffusion. In this case, the efficiency no longer levels out but increases proportionally to the length of the packing in spite of the Gaussian distribution of the diameters. The non-uniformity of behavior of these conduits is leveled by the molecular diffusion between the latter.

This phenomenon is specifically relevant for a chromatography method, where high efficiencies are required. It will be noted that such properties are of secondary importance for an adsorption or catalysis method, and useless for a filtration method.

Figure 8:
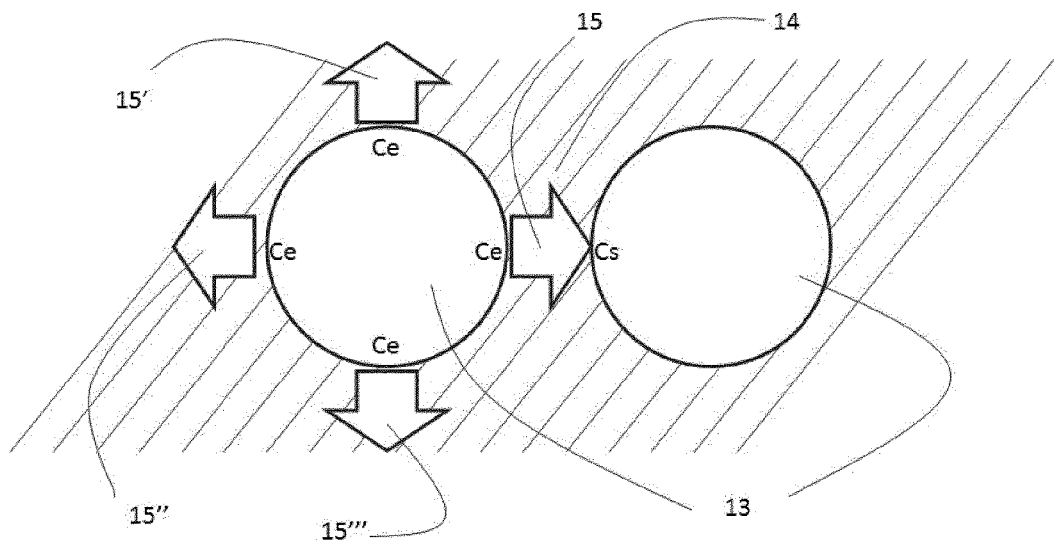
Figure 9:
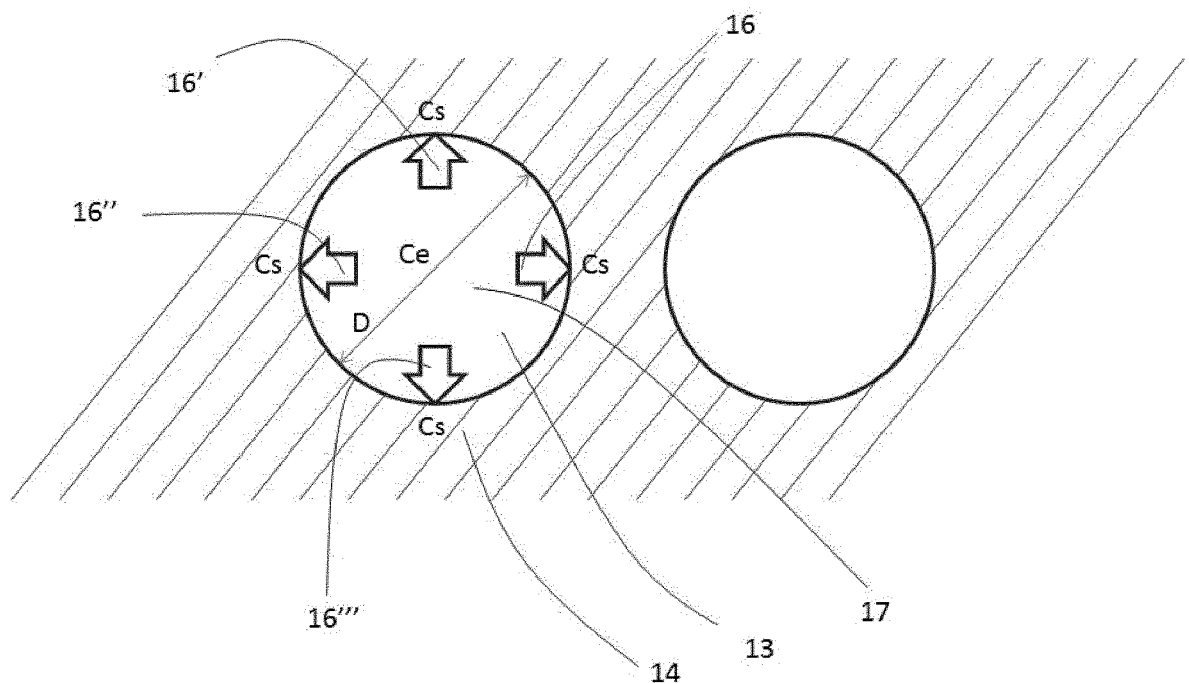

FIGS. 8 and 9 describe diffusive flows, considered for defining the concept of molecular permeability according to the invention.

FIG. 8 describes the molar diffusion flow rate between the adjacent conduits under the effect of a given concentration difference of the species to be separated between the walls of said conduits. The conduit 13 is assumed to have a concentration profile dictated by the hydrodynamic conditions of the flow resulting in an average concentration Ce. The adjacent conduits are assume to have a concentration Cs less than Ce here. The average molar diffusion flow rate Phip is formed by the sum of the flows (15, 15', 15", 15''') leaving the periphery of the conduit 13 and crossing the packing 14. The medium 14 consists of a porous organic gel, of organic liquid and of mobile phase, and an optional porous support of the latter.

FIG. 9 describes the average diffusion molar flow rate Phic between a conduit and the stationary phase making up the packing, under the effect of a same concentration difference of the species to be separated between the conduits and the wall of said conduits. The diffusion molar flow rate between a conduit 13 and the stationary phase formed by the packing is measured through a peripheral area of the conduit delimiting the empty capillary in which flows the fluid, under the effect of the same concentration difference of the species to be separated. The exchange is calculated on the basis of an average concentration Ce of the eluent flow rate in the conduit. The periphery of the conduit is assume to be at a concentration Cs. The diffusion molar flow rate is formed by the sum of the flows (16, 16', 16", 16''') passing from the central area of the conduit 13 to the packing 14.

The concentrations are expressed in mol/m$^3$.

Figure 12:
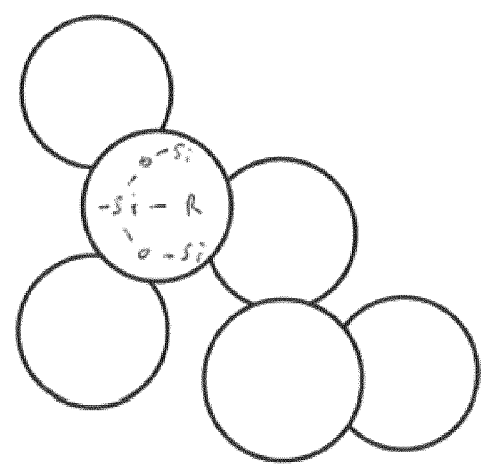
FIG. 12 illustrates a packing formed with an organic gel consisting of an organometal material including in its bulk the product of a co-condensation of orthosilicates and of silanes.

FIG. 12 illustrates a packing consisting of an organic gel comprising in its bulk the product of a co-condensation of orthosilicates and of silanes. These silanes may include one, two or three Si—C or Si—R bonds. The conduits are in this case anisotropic macropores, the direction or the morphology of which promotes axial flow of the eluting phase in the packing, and included in the latter. R may be any carbon radical, such as a propyl, butyl, octyl, octadecyl radical, a primary, secondary, tertiary or quaternary amine, an alcohol, etc. . . . or in a non-limiting way one or several mono-, bi- or tri-functional silanes from among those mentioned earlier in this text in the list of coupling agents.

Figure 13:
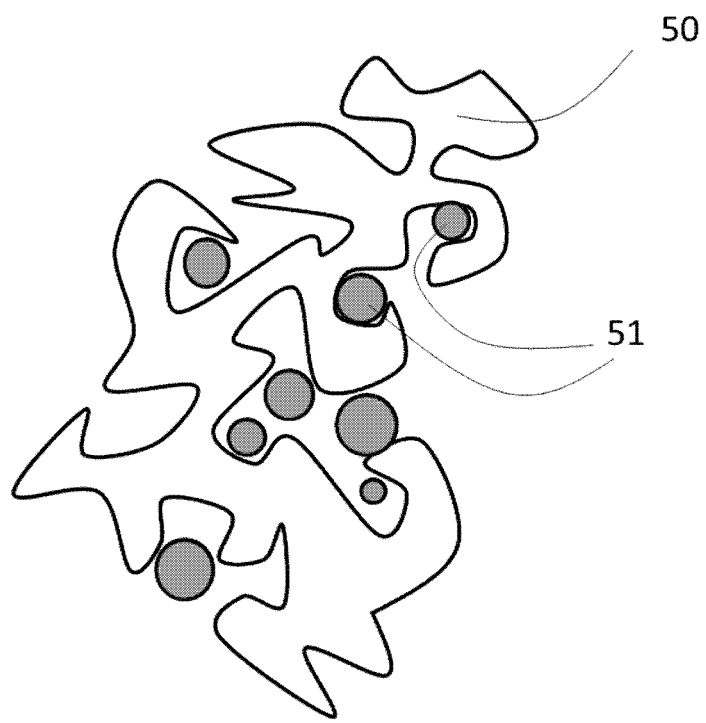
FIG. 13 illustrates a packing according to the invention formed with an organic or mineral porous mass comprising particles or nanoparticles dispersed in its pores.

FIG. 13 represents a packing according to the invention consisting of an organic or mineral porous mass 50 including organic particles or nanoparticles 51 dispersed in its pores.

FIG. 16 illustrates a sectional view along a direction parallel to its major axis of an alternative of a packing for chromatography according to the invention wherein the conduits 61, 61' are included in a porous monolithic mass 63 and are stacked and juxtaposed. In this case, the conduits open in an ordered or random way into the material 62 permeable to the eluent. In order to view this structure, it may be considered that these conduits may have for precursor of the cut, stacked and juxtaposed fibers directionally so as to give them an average direction parallel to the direction of flow of the fluid in the packing. Advantageously according to the invention, the conduits are of homogenous lengths and diameters and as parallel as possible.

The examples developed below describe different manufacturing methods of a packing for applying a chromatographic process according to the invention.

Example 1: Manufacturing of a Multicapillary Packing in an Anion Exchanger

The starting material is a thread in a tin and bismuth alloy in proportions of 58%, 42% by weight respectively. It has a diameter of $^{15}/_{100}$ of a mm. The thread is covered by soaking with a thin layer of a mixture of styrene, of 8% by weight of divinylbenzene by weight, 0.4% by weight of a polymerization activator (azobis isobutyronitrile) and of a glass powder milled to 10 μm (one volume of glass powder for one volume of the solution). It is positioned for 24 hours at 70° C. under nitrogen. The thread is cut in rectilinear segments with a length of 200 mm. They are then introduced as a bundle with a diameter of about 4 mm in a glass tube with a length of 160 mm and an inner diameter 4 mm prepared beforehand.

A mixture of styrene, of 8% by weight of divinylbenzene and 0.4% by weight of a polymerization activator (t-butyl hydroperoxide) is then cast into the tube through interstices between the thread segments so as to totally fill this empty space. The mixture is polymerized for 24 hours at 120° C.

The thereby produced composite is released by sectioning the thread segments on either side of the glass tube flushed with its ends, perpendicularly to said segments.

The composite is brought to 145° C. in an oven, until melting of the thread segments and the molten metal is removed by ultrasonic vibrations and under the action of gravity and of circulation of pressurized air.

The thereby produced monolith is converted into a basic ion exchanger by subjecting it to the action of a stream of a solution with 15% by weight of tin tetrachloride in chlorodimethyl ether at 0° C. for 6 hours. The packing is then washed with methanol and then with water and quaternized by the action of a stream of an aqueous solution of 40% trimethylamine for a period of ten hours. The packing is then washed until neutrality and the quaternary ammonium is converted into its hydroxylated form.

Example 2: Manufacturing of a Multicapillary Packing in a Cation Exchanger

A monolith with porous walls of alpha alumina with a length of 160 mm having 100 conduits of a diameter of 0.45 mm distributed according to a square mesh with a side of 1.2 mm is produced by extrusion and sintering of an alpha alumina powder with an elementary diameter of 20 μm.

A mixture of 49 g of styrene, 1 g of divinylbenzene, 200 mg of a polymerization activator (t-butyl hydroperoxide) and 150 ml of pentane is then cast into the monolith so as to totally fill the porosity of the wall. The core of the conduits is drained from the liquid phase which it contains. The monolith brought to 50° C. so as to evaporate the majority of the pentane, and then shortly a vacuum is applied so as to enhance this evaporation. The deposit of monomers and of activator thereby deposited as a liquid film covering the wall of the alumina grains is polymerized for 24 hours at 120° C. under a nitrogen atmosphere.

The thereby produced monolith is converted into an acid ion exchanger by sulfonation. The monolith is treated with a stream of concentrated sulfuric acid containing 0.1% by weight of silver carbonate at 100° C. for 3 hours. The sulfonated packing is then gradually treated with less concentrated sulfuric acid and finally with distilled water.

Example 3: Manufacturing of a Multicapillary Packing Having Porosity

A mixture is prepared containing 8 g of hydroxyethyl methacrylate, 32 g of divinylbenzene, 445 mg of azobisisobutyronitrile, 60 g of dodecanol and the mixture is degassed in nitrogen for 20 minutes.

This mixture is brought to 70° C. in 24 hours. The mixture polymerizes.

The thereby produced monolith A is washed by percolating THF for 30 minutes and drying in the oven at 90° C.

The monolith A is milled under liquid nitrogen until the desired diameter of the grains is obtained.

The porosity of these grains is filled with a paraffinic wax melting at 80° C. by adding under hot conditions the molten wax into the powder with stirring.

Example 4

A thread of a mixture of indium and tin in weight proportions 48, 52 melting at 118° C., is produced with a diameter of 0.25 mm.

The thread is covered by adhesive bonding on its surface by means of an aqueous solution of PVA (polyvinyl alcohol) of a monolayer of the grains of the monolith A obtained in Example 3, milled to 50 μm. The thread is cut in rectilinear segments of a length of 12 cm and assembled in a bundle with a diameter of about 4 mm in a glass tube with a length of 100 mm and with an inner diameter of 4 mm prepared beforehand.

In parallel a mixture is prepared containing 8 g of hydroxyethyl methacrylate, 32 g of divinylbenzene, 445 mg of azobisisobutyronitrile, 60 g of dodecanol and the mixture is degassed in nitrogen for 20 minutes.

The bundle prepared earlier is filled with this mixture and brought to 70° C. in 24 hours. The mixture polymerizes.

The thereby produced composite is released by severing the thread segments on either side of the glass tube flushed with its ends, perpendicularly to said segments.

The composite is brought to 125° C. in an oven, until the thread segments melt, and the molten metal is easily removed by applying ultrasonic vibrations by gravity and under a slight circulation of pressurized air.

The thereby produced monolith is washed with a stream of n-octane at 120° C. for 30 minutes, and then with THF (tetrahydrofurane) at room temperature for 30 minutes.

Example 5: Manufacturing of a Multicapillary Packing Having Porosity

A mixture is prepared containing 8 g of hydroxyethyl methacrylate, 32 g of divinylbenzene, 445 mg of azobisisobutyronitrile, 60 g of dodecanol and the mixture is degassed in nitrogen for 20 minutes.

This mixture is brought to 70° C. within 24 hours. The mixture polymerizes.

The thereby produced monolith B is washed by percolating THF for 30 minutes and drying in the oven at 90° C.

The monolith B is milled in liquid nitrogen until a grain diameter of 50 μm is obtained.

The porosity of these grains is filled with paraffinic wax melting at 80° C. by adding under hot conditions molten wax into the powder with stirring.

A polydioxanone thread is produced with a diameter of 0.25 mm.

The thread is covered by soaking and adhesive bonding by means of a solution of aqueous polyvinyl alcohol deposited beforehand of a thin layer of grains of the milled monolith B to 50 μm. It is then cut into lengths of 120 mm and assembled in a bundle with a diameter of about 4 mm in a glass tube with a length of 100 mm and an inner diameter of 4 mm prepared beforehand.

In parallel a mixture is prepared containing 8 g of hydroxyethyl methacrylate, 32 g of divinylbenzene, 890 mg of azobisisobutyronitrile, 60 g of dodecanol and the mixture is degassed in nitrogen for 20 minutes.

The bundle prepared earlier is filled with this mixture and brought to 70° C. within 24 hours. The mixture polymerizes.

The thereby produced composite is released by severing the thread segments on either side of the glass tube flushed with its ends, perpendicularly to said segments.

The thereby produced monolith is washed with a stream of n-octane at 120° C. for 30 minutes, and then with THF (tetrahydrofurane) at room temperature for 30 minutes.

The polydioxanone threads are dissolved with soda N at 90° C. perlocated through the packing for 1 hour, and then the packing is washed with distilled water until neutrality and dried at 105° C.

The monolith is subjected in an oven to an extensive vacuum at 125° C., until melting and volatilization of the wax residues and of the light organic materials.

Example 6: Manufacturing of a Multicapillary Packing in Cross-Linked Agarose A mixture is prepared containing 8 g of hydroxyethyl methacrylate, 32 g of divinylbenzene, 445 mg of azobisisobutyronitrile, 60 g of dodecanol and the mixture is degassed in nitrogen for 20 minutes.

This mixture is brought to 70° C. within 24 hours. The mixture polymerizes.

The thereby produced monolith C is washed by percolating THF for 30 minutes and dried in the oven at 90° C.

The monolith C is milled in liquid nitrogen until a grain diameter of 50 μm is obtained.

The porosity of these grains is filled with paraffinic wax melting at 80° C. by adding under hot conditions molten wax into the powder with stirring.

A polydioxanone thread is produced with a diameter of 0.25 mm.

The thread is covered by soaking with a thin layer of grains of the monolith C milled to 50 μm. It is then cut into lengths of 120 mm and assembled into a bundle with a diameter of about 4 mm in a glass tube with a length of 100 mm and an inter diameter of 4 mm prepared beforehand.

In parallel, a mixture is prepared containing 8 g of hydroxyethyl methacrylate, 32 g of divinylbenzene, 445 mg of azobisisobutyronitrile, 60 g of dodecanol and the mixture is degassed in nitrogen for 20 minutes.

The bundle prepared earlier is filled with this mixture and brought to 70° C. within 24 hours. The mixture polymerizes.

The thereby produced composite is released by severing the thread segments on either side of the glass tube flushed with its ends, perpendicularly to said segments.

The thereby produced monolith is washed with a stream of n-octane at 120° C. for 30 minutes, and then with THF (tetrahydrofurane) at room temperature for 30 minutes.

The polydioxanone thread are dissolved with soda N at 90° C. perlocated through the packing for 1 hour, and then the packing is washed with distilled water until neutrality and dried at 105° C.

The monolith is subjected in an oven to an extensive vacuum at 125° C., until melting and volatilization of the wax residues and of the lightweight organic materials. One deciliter of agarose beads are dissolved in one deciliter of demineralized water at 95° C.

The porosity of the monolith is impregnated with this solution by soaking and draining at 95° C. the core of the conduits and then cooling.

The occluded and gelled agarose is washed with distilled water.

One deciliter of NaOH solution 1 N containing 2 ml of epichlorohydrin and 0.5 g of $NaBH_4$ is prepared. The conduits of the monolith are filled with this.

The assembly is brought to 60° C. for one hour.

The obtained cross-linked gel is washed with hot water until neutrality.

Example 7: Manufacturing of a Multicapillary Packing in Cross-Linked Agarose A monolith with porous walls of alpha alumina with a length of 300 mm having a 100 conduits of a diameter of 0.45 mm distributed according to a square mesh with a side of 1.2 mm is produced by extrusion and sintering of an alpha alumina powder with an elementary diameter of 20 μm.

A deciliter of agarose beads are dissolved in a deciliter of demineralized water at 95° C.

The porosity of the monolith is impregnated with this solution by soaking and draining at 95° C. the core of the conduits and then cooling.

The occluded and gelled agarose is washed with distilled water.

A deciliter of a solution of NaOH 1 N containing 1 ml of epichlorohydrin and 0.25 g of $NaBH_4$ is prepared. The conduits of the monolith are filled therewith.

The assembly is brought to 60° C. for one hour.

The obtained cross-linked gel is washed with hot water until neutrality.

Example 8: Manufacturing of a Multicapillary Packing in Cross-Linked Agarose A monolith with porous walls in Pyrex glass with a length of 150 mm having a 100 conduits with a diameter of 0.45 mm distributed according to a square mesh with a side of 1.2 mm is produced by extrusion and sintering of a Pyrex glass powder with an elementary diameter of 20 μm.

A deciliter of agarose beads are dissolved in one deciliter of demineralized water at 95° C.

The porosity of the monolith is impregnated with this solution by soaking and draining of the conduits at 95° C. and then cooling.

The occluded and gelled agarose is washed with distilled water.

One deciliter of a solution of NaOH 1 N containing 20 ml of epichlorohydrin and 5 g of $NaBH_4$ is prepared. The conduits of the monolith are filled therewith.

The whole is brought to 60° C. for one hour.

The obtained cross-linked gel is washed with hot water until neutrality.

50 ml of NaOH 2N and 0.25 g of $NaBH_4$ are prepared. The monolith is percolated with this solution, and is autoclaved at 120° C. for one hour.

The gel is washed with NaOH 1 N containing 0.5% of hot $NaBH_4$, and then cold.

The monolith is rapidly transferred into an ice bath buffered to pH 4 by means of a solution of acetic acid and of sodium acetate.

The monolith is washed by circulating hot distilled water, and then frozen.

Example 9: Manufacturing of a Multicapillary Packing in Cross-Linked and Functionalized Agarose A monolith with porous walls of alpha alumina with a length of 150 mm having 100 conduits with a diameter of 0.45 mm distributed according to a square mesh with a side of 1.2 mm, is produced by extrusion and sintering of an alpha alumina powder with an elementary diameter of 20 μm.

One litre of agarose beads are dissolved in one litre of demineralized water at 95° C.

The porosity of the monolith is impregnated with this solution by soaking and draining of the conduits at 95° C. and then cooling.

The occluded and gelled agarose is washed with distilled water.

A deciliter of a solution of NaOH 1 N containing 1 ml of epichlorohydrin and 0.25 g of $NaBH_4$ is prepared. The conduits of the monolith are filled therewith.

The whole is brought to 60° C. for one hour.

The obtained cross-linked gel is washed with hot water until neutrality.

50 ml of NaOH 2N and 0.25 g of $NaBH_4$ are prepared. The monolith is percolated with this solution, and is autoclaved at 120° C. for one hour.

The gel is washed with NaOH 1 N containing 0.5% of hot $NaBH_4$, and then cold.

The monolith is rapidly transferred into an ice bath buffered to pH 4 by means of a solution of acetic acid and of sodium acetate.

The monolith is washed by circulation of hot distilled water, and then frozen.

The monolith is freeze-dried and the dry gel is treated with 60 ml of a mixture of pyridine and of acetic acid with equal volumes. The acetylation is conducted by adding 4 ml of acetyl chloride at 60° C. for 75 mins, by circulating the mixture through conduits.

The monolith is transferred into 100 ml of dry dioxane. 1 g of $LiAlH_4$ are added to the medium, by circulating the mixture through the conduits. The temperature is slowly increased up to 80° C. and maintained for 2 hours.

The reaction is stopped by adding ethyl acetate and then water.

The monolith is cooled in an ice bath. Hydrochloric acid 1M is circulated through the conduits. The monolith is briefly washed with HCl 0.1 M and then with water.

Deacetylation is conducted at 80° C. for 15 minutes with NaOH M containing 0.1% of $NaBH_4$.

Example 10: Manufacturing of a Multicapillary Packing in a Polymeric Gel by Immersion of a Hollow Polypropylene Fiber 500 microporous fibers of polypropylene CELGARD x 30-240 with an external diameter of 300 µm and an internal diameter of 240 µm and with a length of 300 mm with the shape of a cylinder in a glass tube with an inner diameter of 8 mm are aligned contiguously.

A mixture containing 16 g of hydroxyethyl methacrylate, 64 g of divinylbenzene, 890 mg of azobisisobutyronitrile, 120 g of dodecanol is prepared and it is degassed under nitrogen for 20 minutes.

The wall, the lumen and the interstices of the bundle of hollow fibers are impregnated with this mixture by immersion in vacuo and then setting it back to atmospheric pressure followed by draining of the lumen of the fibers.

The bundle is brought to 70° C. for 24 hours. The mixture polymerizes.

The mixture gels in the porous wall of the fibers under these conditions.

The thereby made monolith is washed with THF for 30 minutes, and then dried under a dry air stream at 70° C.

Example 11: Manufacturing of a Multicapillary Packing in a Polymeric Gel by Molding 2 portions of polypropylene having an MI of 0.8 g/10 mins and one part and a half of tetrahydronaphthalene are mixed into a homogeneous mixture at a temperature of about 160° C. and after cooling at 140° C. are mixed to a portion of styrene containing 8% by weight of divinylbenzene. 0.5% by weight of p-methoxyphenol is added to the mixture as a polymerization inhibitor and 0.1% by weight of di-t-butyl hydroperoxide as a polymerization initiator. The mixing is continued for 5 mins. The mixture is then polymerized in a pressurized reactor at 180° C. for 8 hours.

The resulting polymer is extruded into a sheet with a width of 50 mm and a thickness of 0.5 mm including 100 equidistant grooves with a width of 0.4 mm and a depth of 0.4 mm.

The resulting sheet is cut into sheets with lengths of 250 mm. The solvent present in these sheets is extracted with boiling methanol.

100 sheets are then stacked according to their length in a square bundle making up a packing for chromatography.

Example 12: Manufacturing of a Multicapillary Packing Supporting Colloidal Silica A monolith is obtained according to the procedure given in Example 5.

The porosity of the monolith is impregnated with a solution of silica sol Ludox SM30 with 30% of dry material by percolating this sol and then by draining it out of the lumen of the fibers.

The silica sol is dried in situ by circulation of dry air at 80° C.

Example 13: Manufacturing of a Multicapillary Packing in Cellulose

A monolith with porous walls of alpha alumina with a length of 300 mm having 100 conduits with a diameter of 0.45 mm distributed according to a square mesh with a side of 1.2 mm is produced by extrusion and sintering of an alpha alumina powder with an elementary diameter of 20 µm.

150 g of cellulose for chromatography on a thin layer (brand Sigma Aldrich) are milled down to a particle diameter of 1 µm.

The obtained powder is gradually added to 50 ml of aqueous colloidal polystyrene with a particle size of 0.35 µm with a weight concentration of 5% (brand PolyScience Inc.) until a thick suspension is obtained having a viscosity of about 1 Poiseuille.

The obtained suspension is cast into the monolith through the conduits so as to fill the porosity of the walls, and the conduits are drained of the suspension which they contain.

The monolith is dried in the oven at 80° C.

Example 14: Manufacturing of a Multicapillary Packing with an Organic Liquid Stationary Phase An organic monolith is prepared by the procedure shown in Example 5.

The packing is impregnated by immersion in cyclohexyl acetate followed by drainage of the lumen of the conduits.

Example 15: Manufacturing of a Multicapillary Packing by Immersion of a Hollow Polypropylene Fiber in an Organic Liquid 500 microporous fibers of polypropylene CELGARD X30-240 with an external diameter of 300 µm and an internal diameter of 240 µm and with a length of 300 mm in the form of a cylinder in a glass tube with an inner diameter of 8 mm are contiguously aligned.

The wall, the lumen and the interstices of the bundle of hollow fibers between the fibers are impregnated with cyclohexyl acetate by total immersion in vacuo and then set back to atmospheric pressure followed by draining of the lumen of the fibers.

The interstices between the individual fibers are filled with cyclohexyl acetate.

Example 16: Manufacturing of a Multicapillary Packing with an Organic Liquid Stationary Phase A monolith with porous walls of Pyrex glass with a length of 300 mm having a 100 conduits with a diameter of 0.45 mm distributed according to a square mesh with a side of 1.2 mm is produced by extrusion and sintering of a Pyrex glass powder with an elementary diameter of 20 μm.

The packing is immersed in hexamethyl disilazane and brought to 140° C. with pressure in a closed container so as to hydrophobicize the surface of the glass.

The packing is impregnated by immersion in cyclohexyl acetate followed by drainage of the lumen of the conduits.

Example 17: Manufacturing of a Multicapillary Packing in Sepharose

A monolith with porous walls of alpha alumina with a length of 300 mm having 100 conduits with a diameter of 0.45 mm distributed according to a square mesh with a side of 1.2 mm is produced by extrusion and sintering of an alpha alumina powder with an elementary diameter of 20 μm.

150 g of Sepharose (GE HealthCare) are milled in liquid nitrogen down to a particle diameter of 1 μm. The obtained powder is gradually added to 50 ml of aqueous colloidal polystyrene with a particle size of 0.80 μm and with a weight concentration of 5% (brand PolyScience Inc.) until a thick suspension is obtained having a viscosity of about 1 Poiseuille.

The obtained suspension is cast in the monolith through the conduits so as to fill the porosity of the walls, and the conduits are drained of the suspension which they contain.

The monolith is dried in the oven at 80° C.

Exemplary Embodiment 18

A mixture containing 8 g of ethylstyrene, 32 g of divinylbenzene, 445 mg of azobisisobutyronitrile, 120 g of dodecanol is prepared and it is degassed under nitrogen for 20 minutes.

This mixture is brought to 70° C. for 24 hours. The mixture polymerizes.

The thereby made monolith A is washed by percolating THF for 30 minutes and dried in the oven at 90° C.

The monolith A is milled under liquid nitrogen until a grain diameter of 25 μm is obtained.

The porosity of these grains is filled with a paraffinic wax melting at 80° C. by adding under hot conditions molten wax into the powder with stirring.

A polydioxanone thread is produced with a diameter of 0.05 mm.

The thread is covered by soaking and adhesive bonding by means of a solution of aqueous polyvinyl alcohol deposited beforehand with a thin layer of grains of the monolith B milled to 25 μm. It is then cut into lengths of 120 mm and assembled into a bundle of about 4 mm in a glass tube with a length of 75 mm, with an external diameter of 6.35 mm and with an inner diameter of 4 mm prepared beforehand.

In parallel, a mixture containing 8 g of ethylstyrene, 32 g of divinylbenzene, 890 mg of azobisisobutyronitrile, 120 g of dodecanol is prepared and it is degassed under nitrogen for 20 minutes.

The bundle prepared beforehand is filled with this mixture and brought to 70° C. for 24 hours. The mixture polymerizes.

The thereby produced composite is released by severing the thread segments on either side of the glass tube flushed with its ends, perpendicularly to said segments.

The thereby produced monolith is washed with a current of n-octane at 120° C. for 30 minutes, and then with THF (tetrahydrofurane) at room temperature for 30 minutes.

The polydioxanone threads are dissolved with soda N at 90° C. perlocated through the packing for 1 hour, and then the packing is washed with distilled water until neutrality and dried at 105° C. The monolith is brought into an oven in an extensive vacuum at 125° C., until melting and volatilization of the wax residues and of the lightweight organic materials.

The thereby obtained monolith may be directly used for liquid chromatography of molecules with molecular weights from 500 g/mol to 5,000 g/mol.

Exemplary Embodiment 19

A monolith is prepared following the procedure described in Example 18.

Figure 31:
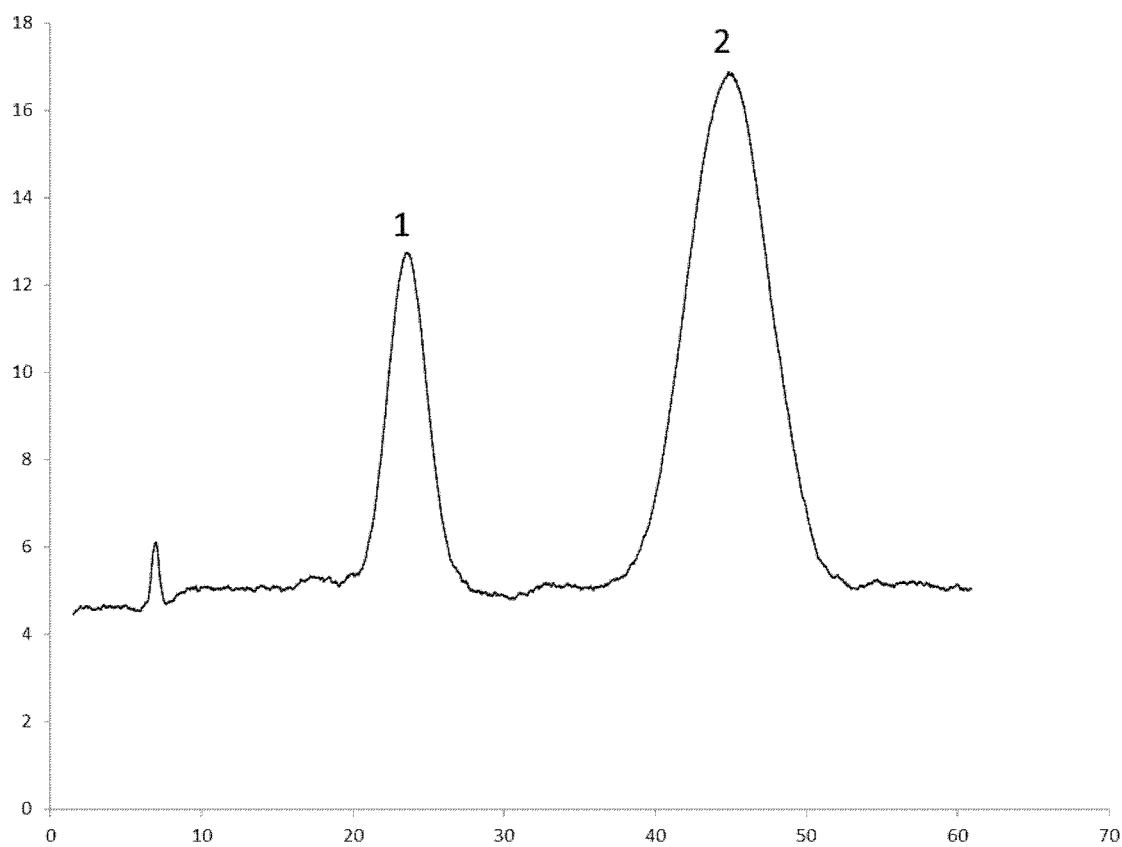

FIG. 31 represents a chromatogram produced with this monolith.

The conditions are the following:
Chromatograph Agilent 1100, UV detector with variable wavelength
Solvent A Water/Acetonitrile 95/5 (v/v)+0.1% of trifluoroacetic acid
Solvent B Water/Acetonitrile 5/95 (v/v)+0.1% of trifluoroacetic acid
Gradient Mode 1-65% B within 60 mins
Room T°
Flow rate: 0.012 ml/min
Detection wavelength: 235 nm The separated species are angiotensin II (1) and the lysozyme (2).

The axis of the abscissas is the time in mins, the axis of the ordinates is the response of the detector.

Exemplary Embodiment 20

A preform of the channels of the monolith is made by producing a bundle consisting of three families of nylon 66 threads with respectively 50, 60 and 70 μm in diameter.

The bundle is made into a square bundle with 12 threads on the sides distributed according to a square mesh with a pitch of 120 μm, by means of supporting device of the type shown in FIG. 30.

The threads of the three families are alternatively positioned in successive layers of 12 threads of the same diameter according to the sequence 50/60/70/60/50/60/70/6050/60/70/60.

The bundle is made with a length of 75 mm.

The bundle of needles is then inserted into a square housing with a side of 1.5 mm and a length of 75 mm dug in a sheet of 20×10×75 mm of stainless steel 316L, and with a planar lid in a sheet of 20×10×75 mm of PTFE (Teflon brand deposited by DuPont de Nemours).

200 g of silica gel for chromatography with a pore size of 6 nm (SiliCycle) is milled down to an average particle diameter of about 3 µm.

The powder is gradually suspended in 500 ml of a mixture of 200 ml of silica sol TM50 from Grace with 50% of dry material and a particle size of 20 nm and with 300 ml of demineralized water.

The bundle of nylon needles in the stainless steel housing is impregnated with this mixture. The liquid should fill the totality of the bundle, which should be found immersed therein.

Both portions, stainless steel and Teflon are screwed against each other.

The mixture is maintained at 90° C. under a humid saturated atmosphere until complete gelling of the sol.

The upper PTFE lid maintaining the bundle is extracted from the gel, the ends of the gel are cleared, and the bundle in its stainless steel housing is gradually brought with a rise in temperature of 5° C./min up to 95° C. in an oven. They are maintained for 5 hours at this temperature.

The dry bundle in its stainless steel housing is gradually brought with a rise in temperature of 1° C./min up to 550° C. in an oven under atmospheric air. It is maintained for 5 hours at this temperature.

A lid manufactured in a sheet of 20×10×75 mm of stainless steel 316L is replaced for closing the packing as a substitute for the PTFE half-shell.

The monolith is washed with deionized water perlocated through the free conduits and dried at 105° C. for two hours.

The end pieces (FIGS. 22, 23) are attached (FIG. 24) on the column and the whole is sealed with a film of two-component epoxy adhesive. The column is connected to the chromatograph.

A characterization of the silicic material of this monolith by adsorption with nitrogen shows a median diameter of the mesopores of 8 nm and a porous volume fraction of 55%.

Figure 32:
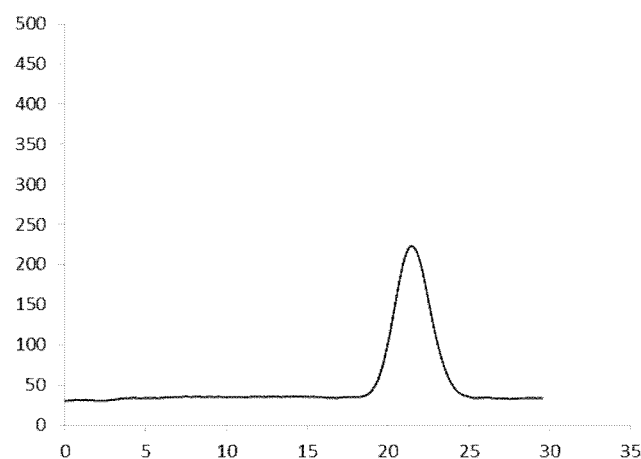
Figure 33:
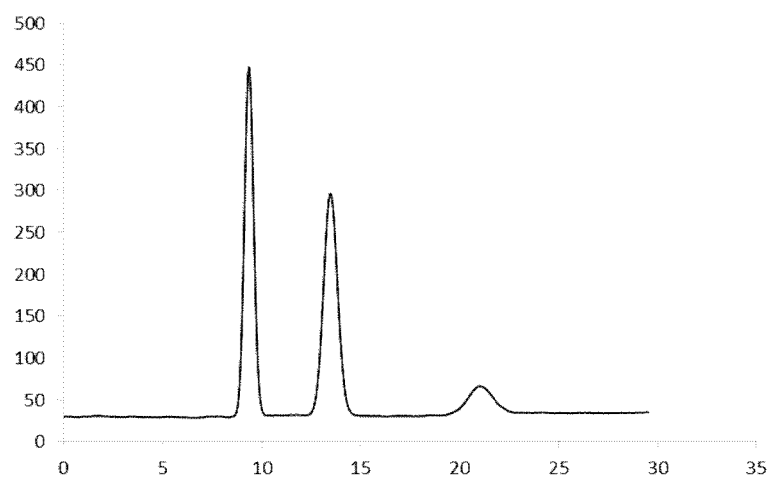

FIGS. 32 and 33 show chromatograms obtained by means of this monolith.

The conditions are the following:
  Chromatograph Agilent 1100, detector with a diode array
  Isocratic Mode
  Solvent 100% Water
  Room T°
  Flow rate: 0.01 ml/min
  Detection Wavelength: 235 nm The axis of the abscissas is the time in mins, the axis of the ordinates is the response of the detector.

FIG. 32: trace of acetic acid diluted to 0.1 N

FIG. 33: tracer of polystyrene latex microspheres (Applied Physics AP3100A) with a diameter of 100 nm, a solution with 1,000 ppm of dry material.

It is noted that the diffusion of the acetic acid between the channels allows a chromatographic response as a single peak. On the contrary, the diameter of the polystyrene particles prevents the occurrence of the diffusive phenomena and each family of channels produces its own elution peak. It is no longer possible in the latter case to associate each peak with a single species.

Exemplary Embodiment 21

A preform of the channels of the monolith is made by producing a bundle consisting of polydioxanone threads with a diameter of 50 µm.

The bundle is made as a square bundle with 10 threads on sides distributed according to a square mesh of a pitch of 100 µm, by means of a supporting device on the type of the one shown in FIGS. 27 to 29. The perforated screen is produced by laser piercing of perforations of 55 µm in a sheet of stainless steel with a thickness of 150 µm.

The bundle is made with a length of 75 mm.

The needle bundle is then inserted into the bottom of a housing with a width of 1.0 mm, with a depth of 2 mm and with a length of 75 mm dug in a sheet of 20×10×75 mm of stainless steel 316L (FIGS. 17 and 18). A planar lid is prepared in a sheet of 20×10×75 mm of stainless steel (FIGS. 19 and 20) is prepared.

In an Erlenmeyer flask with an eroded 25 ml neck, 7 g of polyethylene glycol having a molecular weight of 200 g, 0.37 g of 2,2,2-tri-(2,3-epoxypropyl)-isocyanurate and 1.6 g of bis(4-aminocyclohexyl)methane with stirring is mixed until dissolution on a heated magnetic stirrer.

After which, the mixture is injected into the housing of the preceding stainless steel base including the bundle of 50 µm threads and the lid is laid so as to define the channel of the monolith. The whole is brought to 80° C. for 20 h in order to be polymerized.

The resulting bar is washed with water and methanol, and then set to percolate with soda N at 90° C. for 24 h until dissolution of the threads.

After washing with water until neutrality, the packing is dried in an oven in vacuo.

The end pieces (FIGS. 22 23) are attached (FIG. 24) on the column and the whole is sealed with a film of two-component epoxy adhesive. The column is connected to the chromatograph.

Figure 34:
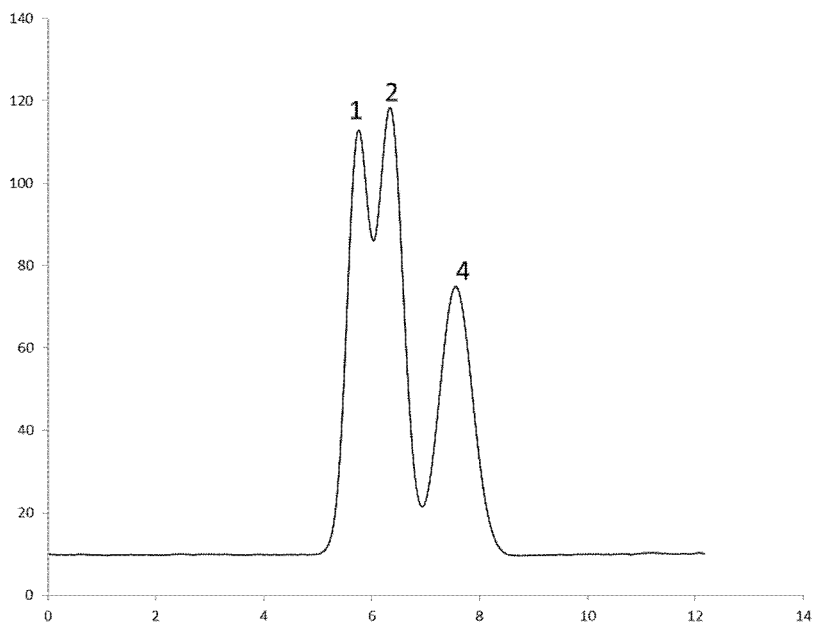

FIG. 34 illustrates a chromatogram produced with this monolith.

The conditions are the following:
  Solvent Water/Acetonitrile 60/40 (100 ml/100 ml)+20 mM of phosphate buffer at pH7
  Room T°
  Flow rate: 0.01 ml/min
  Detection Wavelength: 210 nm The separated species are uracil (1), benzene (2) and hexylbenzene (3).

The axis of the abscissas is the time in mins, the axis of the ordinates is the response of the detector.

FIGS. 17 to 24 represent views of the construction of a multicapillary chromatographic column.

FIGS. 17-18 and 19-20, respectively illustrate two elements forming the body of the column, i.e. a lower block 90 and an upper block 91. A housing or a rectangular section channel 93 is dug in the lower block 90. This housing receives and molds the monolith. Advantageously, the synthesis of the monolith y is made therein. FIG. 17 is a side view of the part 90, FIG. 18 is a view thereof along its section. L represents the length of the part. The part is provided with tapped perforations allowing its assembling.

FIG. 19 is a view of the upper block 91 along its section, FIG. 20 is a side view thereof. The part 91 includes a male portion 94 intended to be fitted into the channel 93.

FIG. 21 illustrates a sectional view of the fitted-in parts 90 and 91. Their fitting produces a free channel 95 in which is housed the monolith.

Figure 22:
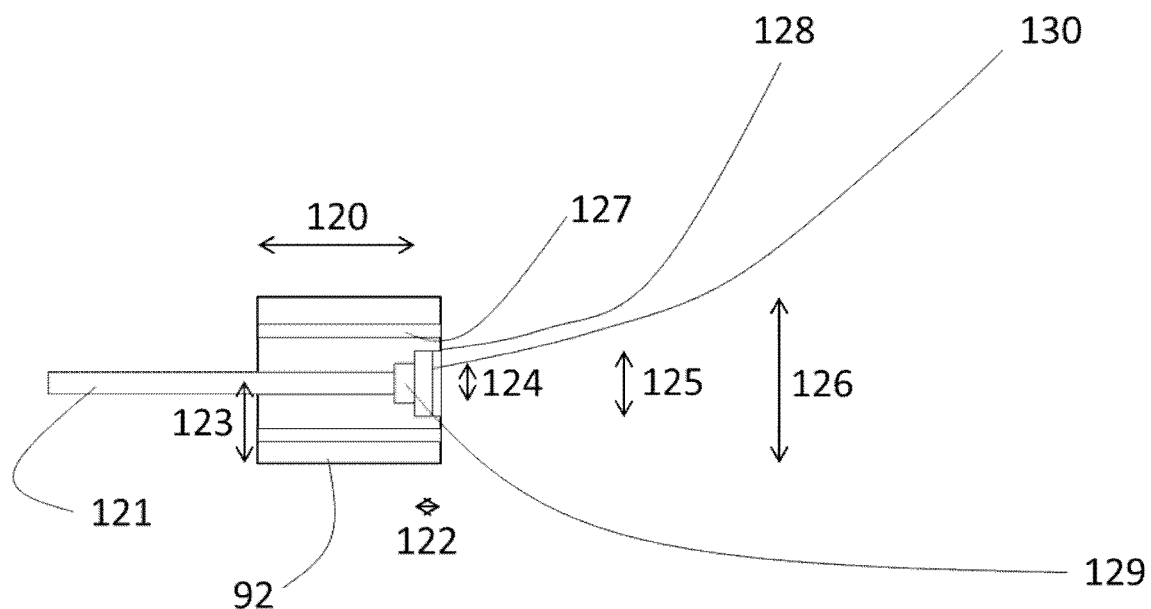

FIGS. 22 and 23 respectively illustrate in a profile view and in a front view the end-piece part 92 of the column allowing it to be connected to the fluids. The part 92 includes a tube 121 sealably welded or adhesively bonded giving the possibility of bringing or discharging the mobile phase as far as the sintered filter 130 via an annular space 129. The filter is accommodated in an annular space 128. The perforations 127 give the possibility of assembling the column.

FIG. 24 schematically illustrates the geometry of the final assembly of the elements 90, 91 and 92. The seal of the whole may be simply produced by covering it with a film of a two-component adhesive.

The table below explains, in an example, the dimensions illustrated in FIGS. 17-24.

| Reference | Dimension (mm) | Comment |
| --- | --- | --- |
| 100 | 10 | |
| 101 | 15 | |
| 102 | 100 | |
| 103 | M3 | Threading 3 mm depth 7 mm |
| 104 | 7 | |
| 105 | 10 | |
| 106 | 4 | |
| 107 | 2 | |
| 108 | 4 | |
| 109 | 6 | |
| 110 | 12 | |
| 111 | 3 mm | Perforation (diameter) |
| 112 | M3 | Threading 3 mm depth 7 mm |
| 114 | 1.98 | |
| 115 | 2.0 | |
| 116 | 2.0 | |
| 117 | 20 | |
| 118 | 4 | |
| 120 | 20 | |
| 121 | 1.58 | 1/16 inch external diameter tube inner diameter 0.25 mm |
| 122 | 1.25 | |
| 124 | 2.1 | Diameter |
| 125 | 3.2 | Diameter |
| 126 | 14 | |
| 127 | 3 | Perforation (diameter) |
| 129 | 0.3 | Depth |
| 130 | 1.0 | Thickness of the sintered filter |
| 131 | 2 | |
| 132 | 4 | |
| 133 | 20 | |
| 134 | 12 | |
| 135 | 14 | |
| 136 | 0.25 | Centered channel |

FIGS. 25 and 26 illustrate a method for assembling precursor threads 152 of the conduits of a monolith. A sheet 150 is perforated with 151 regular holes. Very thin piercings of the order of a few tens of micrometers may be produced by laser piercing in stainless steel sheet, in a brass or polymer sheet. The thread 152 is passed between the perforations of two symmetrical opposite plates 150 spaced apart by the length L so as to produce a bundle of parallel threads. The threads may subsequently be welded or adhered to the sheet 150 with a drop of adhesive.

FIG. 27 schematically illustrates the assembly of the bundle of threads 152 in the part 90. The bundle of threads 152 limited by the sheets 150 is inserted under a slight tension at the bottom of the groove 93. The sheets 150 achieve a temporary seal at both ends. The bundle may be filled with stationary phase, and subsequently pyrolyzed, dissolved, melted or removed by any suitable means.

FIG. 28 illustrates a perforated sheet 150 for which the holes are distributed in layers with three different diameters 153, 154, 155. It is thereby possible to obtain bundles for which threads with three different diameters are positioned in alternating layers.

FIGS. 29 and 30 illustrate chromatographic responses of a same column in the cases when the eluted molecule is with a molecular diameter less than half of the diameter of the pores allowing diffusion between the adjacent conduits (curve in dotted lines), and in the case when its molecular diameter, greater than half the pore diameter, does not allow this (curve in solid lines). The axis of the abscissas is time, the axis of the ordinates is the response of the detector.

In the case of FIG. 29, the column contains three families of conduits with different diameters arranged in superposed layers. An example of such a layout is illustrated as a section in FIG. 28.

It is ascertained that when diffusion takes place, a single peak (curve in dotted lines) results from the interaction of the three families of conduits. When the diffusion is prevented, three peaks (curve in solid lines) are produced for a same compound, making the reading of the chromatogram impossible.

In the case of FIG. 30, the column contains conduits for which the diameters are randomly distributed according to a Gaussian law for which the standard deviation corresponds to 5% of the average diameter of the conduits.

It is ascertained that when diffusion takes place (curve in dotted lines) the number of theoretical plates of the column is 178. When diffusion is prevented (curve in solid lines), the number of theoretical plates of the column is no longer only 50, which shows that the column is considerably less performing.

REFERENCES

[1] "Water Diffusion and Permeability in Unsaturated Polyester Resin Films Characterized by Measurement Performed with a Water-Specific Permeameter: Analysis of the Transient Permeation", S. Marais, M. Métayer, M. Labbe, Journal of Polymer Science, December 1999, Vol. 74, Issue 14, pp. 3380-3396

[2] Chromatographies en phases liquide et supercritique (chromatographies in liquid and supercritical phases), R. Rosset, M. Caudé, A. Jardy, MASSON $3^{th}$ edition, 1991

[3] Measurement of the Effective Diffusivity in Porous Media by the diffusion Cell Method. In-Soo Park, Duong D. Do, Catalysis Review: Science and Engineering, 1996, Vol. 38, Issue 2 pp. 189-247

[4] U.S. Pat. No. 8,404,346 B2

The invention claimed is:

1. A chromatography method wherein a gas, liquid or supercritical mobile phase containing species to be separated is circulated through a packing, said packing comprising:
   a plurality of capillary conduits extending in the packing between a so-called upstream face through which the mobile phase penetrates into the packing and a so-called downstream face through which the mobile phase exits the packing, and
   a continuous medium permeable to molecular diffusion extending between said conduits, including a porous organic gel or an organic liquid and including at least a network of connected pores for which the size is greater than twice the molecular diameter of at least one species to be separated and open on the conduits, so as to provide to said at least one species a diffusive path between said conduits,
   wherein the permittivity of said continous medium towards the species to be separated is greater than 5,000 Barrer.

2. The method according to claim 1, wherein the average molar flow rate of diffusion of the species to be separated between adjacent capillary conduits under an effect of a given concentration difference of said species between the walls of said capillary conduits is greater than 0.01 times the average molar flow rate of diffusion of the species between a capillary conduit and a stationary phase making up the packing under an effect of a same concentration difference of the species to be separated between a fluid conveyed by the capillary conduits and the wall of said capillary conduits.

3. The method according to claim 1, wherein the diameter of the capillary conduits of the packing is less than or equal to 500 μm.

4. The method according to claim 1, wherein the organic gel forming the continuous medium is selected from among:
(a) a copolymer of styrene and of divinylbenzene,
(b) polymethyl methacrylate,
(c) a copolymer of hydroxyethyl methacrylate and of divinylbenzene.

5. The method according to claim 1, wherein the organic gel forming the continuous medium is a polyholoside.

6. The method according to claim 1, wherein the organic liquid forming the continuous medium is selected from among:
(a) an aliphatic or aromatic hydrocarbon,
(b) an aliphatic or aromatic alcohol,
(c) an aliphatic or aromatic ketone,
(d) an aliphatic or aromatic amine,
(e) a halogenated organic compound,
said organic liquid extending in the network of connected pores.

7. The method according to claim 1, wherein the packing comprises a monolith of the organic gel permeable to molecular diffusion through which extend said capillary conduits, said network of connected pores extending within said organic gel.

8. The method according to claim 1, wherein the packing comprises a monolith of a chemically inert porous material containing said network of connected pores, said pores being filled with said organic gel or with said organic liquid permeable to molecular diffusion.

9. The method according to claim 8, wherein the chemically inert material of said monolith is selected from silica, alumina, or a combination of silica and alumina.

10. The method according to claim 1, wherein the packing comprises a monolith of a chemically inert porous material containing said continuous network of pores, the surface of said pores being covered with the organic gel permeable to molecular diffusion over a selected thickness so as to leave, in said continuous network of pores, a free space for diffusion of the mobile phase, said organic gel forming the continuous network of pores between the conduits.

11. The method according to claim 1, wherein the packing comprises a stack of porous fibers each comprising a lumen forming one of the plurality of capillary conduits of the packing and a wall comprising the network of connected pores, said fibers being made contiguous with the porous organic gel or the organic liquid permeable to molecular diffusion.

12. The method according to claim 11, wherein the wall of each fiber is formed with said organic gel permeable to molecular diffusion.

13. The method according to claim 11, wherein the pores of the wall of each fiber are filled with said gel or with said organic liquid permeable to molecular diffusion.

14. The method according to claim 11, wherein the surface of the pores of the wall of each fiber is covered with the organic gel permeable to molecular diffusion over a selected thickness so as to leave, in said network of pores, a free space for diffusion of the mobile phase, said organic gel forming the continuous network of pores inside said wall.

15. The method according to claim 1, wherein the organic gel permeable to molecular diffusion forms the chromatographic stationary phase.

16. The method according to claim 1, wherein the organic gel has pores containing a third party solid body forming the chromatographic stationary phase.

17. A method for manufacturing a packing for applying the chromatography method of claim 1, wherein a gas, liquid or supercritical mobile phase containing species to be separated is circulated through the packing,
wherein the packing comprises a monolith of an organic gel permeable to molecular diffusion through which extend capillary conduits, said network of connected pores extending within said organic gel,
the method comprising the following steps:
providing a bundle of so-called precursor threads of the capillary conduits,
forming a porous matrix around the threads or the conduits, so as to form the monolith, wherein the permittivity of the organic gel towards the species to be separated is greater than 5,000 Barrer,
removing the threads so as to form said capillary conduits.

18. The method according to claim 17, wherein the matrix is made of the organic gel.

19. The manufacturing method according to claim 18, wherein the precursor threads of the capillary conduits are threads meltable at a temperature less than the degradation temperature of the matrix and the removal of said threads comprises the melting and draining of said threads out of the packing.

20. The method according to claim 19, wherein the meltable threads comprise indium, bismuth, tin, gallium, silver or one of their alloys with other metals excluding lead, mercury and cadmium.

21. The method according to claim 17, wherein the matrix comprises a chemically inert material and said matrix is loaded with the organic gel.

22. A method for manufacturing a packing for applying the chromatography method of claim 1, wherein a gas, liquid or supercritical mobile phase containing species to be separated is circulated through the packing,
wherein the packing comprises a stack of porous hollow fibers each comprising a lumen forming one of a plurality of capillary conduits of the packing and a wall comprising a network of connected pores, said fibers being made contiguous with the porous organic gel or the organic liquid permeable to molecular diffusion,
the method comprising the steps:
providing a compact bundle of hollow fibers,
including in the porous wall of the hollow fibers the organic gel or a precursor of said organic gel to be polymerized in situ, so as to leave free and open a lumen of the hollow fibers,
generation of a diffusive connection between said hollow fibers with said organic gel or liquid,
wherein the permittivity of said organic gel or liquid towards the species to be separated is greater than 5,000 Barrer.

23. A method for manufacturing a packing for applying the chromatography method according to claim 1, wherein a molding of the organic gel into a structure defining said capillary conduits is achieved and wherein a permittivity of said organic gel towards the species to be separated is greater than 5,000 Barrer.

24. A chromatography method wherein a gas, liquid or supercritical mobile phase containing species to be separated is circulated through a packing, said packing comprising:
a plurality of capillary conduits extending in the packing between a so-called upstream face through which the mobile phase penetrates into the packing and a so-called downstream face through which the mobile phase exits the packing, and a continuous medium permeable to molecular diffusion extending between said conduits, including a porous organic gel or an organic liquid and including at least a network of connected pores for which the size is greater than twice the molecular diameter of at least one species to be separated and open on the conduits, so as to provide to said at least one species a diffusive path between said conduits, wherein the average molar flow rate of diffusion of the species to be separated between adjacent capillary conduits under an effect of a given concentration difference of said species between the walls of said capillary conduits is greater than 0.01 times the average molar flow rate of diffusion of the species between a capillary conduit and a stationary phase making up the packing under an effect of a same concentration difference of the species to be separated between a fluid conveyed by the capillary conduits and the wall of said capillary conduits.

* * * * *